United States Patent
Ouchi et al.

(10) Patent No.: US 6,952,241 B2
(45) Date of Patent: Oct. 4, 2005

(54) OPTICAL UNIT, VIDEO DISPLAY APPARATUS, AND COLOR SWITCHING METHOD

(75) Inventors: Satoshi Ouchi, Kamakura (JP); Taro Imahase, Fujisawa (JP); Nobuaki Kabuto, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 566 days.

(21) Appl. No.: 09/942,034

(22) Filed: Aug. 30, 2001

(65) Prior Publication Data

US 2002/0063806 A1 May 30, 2002

(30) Foreign Application Priority Data

Oct. 2, 2000 (JP) ........................................ 2000-301830

(51) Int. Cl.[7] ................................................. H04N 9/12
(52) U.S. Cl. ...................................................... 348/742
(58) Field of Search ................................. 348/742, 743, 348/771; 349/96, 97, 117; 353/31, 122; H04N 9/12

(56) References Cited

U.S. PATENT DOCUMENTS

| | | | |
|---|---|---|---|
| 5,347,378 A | * | 9/1994 | Handschy et al. ............ 349/78 |
| 5,921,650 A | | 7/1999 | Doany et al. |
| 6,201,901 B1 | * | 3/2001 | Zhou et al. .................. 382/306 |
| 6,204,901 B1 | * | 3/2001 | Knox ........................... 349/96 |
| 6,273,571 B1 | * | 8/2001 | Sharp et al. ................. 353/122 |

FOREIGN PATENT DOCUMENTS

| | | |
|---|---|---|
| EP | 0 547 603 A2 | 6/1993 |
| EP | 0 676 740 A1 | 10/1995 |

* cited by examiner

*Primary Examiner*—Michael H. Lee
(74) *Attorney, Agent, or Firm*—McDermott Will & Emery LLP

(57) ABSTRACT

A projection-type video display apparatus has a polarizing beam splitter for matching light, which is outputted by a light source unit, to one of S polarizing light and P polarizing light, an optical characteristics switching element for electrically and periodically switching a wavelength band of light outputted by the polarizing beam splitter, a video display element, as a light valve element, for forming an optical image from light outputted by the light source unit, in accordance with a video signal, and a radiating unit for radiating a plurality of color light, which are sequentially outputted by the optical characteristics switching element, to the video display element, wherein light outputted by the video display element is incident on a projecting lens, and a light path from the light source unit to the projecting lens is U-shaped. Consequently, the projection-type video display apparatus becomes compact and has improved contrast.

4 Claims, 24 Drawing Sheets

| R |
|---|
| G |
| B |

| B |
|---|
| R |
| G |

R DISPLAY

G DISPLAY

B DISPLAY

Y DISPLAY

C DISPLAY

M DISPLAY

OPTICAL UNIT, VIDEO DISPLAY APPARATUS, AND COLOR SWITCHING METHOD

BACKGROUND OF THE INVENTION

1. Field of the Invention

The present invention relates to an optical unit, as an optical unit, for projection apparatuses such as a liquid crystal projector apparatus, a reflection-type video display projector apparatus, and a projection-type rear projection television, which project a video image on a screen by using a light valve element, e.g., a liquid crystal panel or a video display element, to a projection-type video display apparatus, and to a color switching method. More particularly, the present invention relates to a technique for projecting a video image by using an electronic time-division optical characteristics switching element capable of periodically switching colors incident on a light valve element.

2. Description of the Related Art

A paper of "Throughput Color Switch for Sequential Color Projection (SID 2000 DIGEST) written by Gary D. Sharp et al. discloses an electronic time-division optical characteristics switching element (hereinafter, simply referred to as an optical characteristics switching element) capable of periodically colors incident on a light valve element by using polarizing rotation control elements for polarizing optical axis of specific wavelength bands such as an R polarizing rotation control element for rotating a polarizing axis of R-light (red light) as P polarizing light and for converting the R-light into S polarizing light, a G polarizing rotation control element for rotating a polarizing axis of G-light (green light) as P polarizing light and for converting the G-light into S polarizing light, and a B polarization rotation control element for rotating a polarizing axis of B-light (blue light) as P polarizing light and for converting the B-light into S polarizing light.

As disclosed in the paper, light from a light source is reflected by a reflector and the reflected light passes through first a first lens array and a second lens array. The passing light is converted into the P polarizing light by a polarizing beam splitter (hereinafter, referred to as a PBS), is transmitted through a condenser, is incident on a transmission-type optical characteristics switching element. Thus, the R-light, the G-light, and B-light are sequentially outputted, are transmitted through the PBS. Those R-, G-, and B-lights are incident on a reflection-type liquid crystal panel and are reflected to the liquid crystal panel. When a video signal displays white, the P polarizing light is converted into the S polarizing light by the liquid panel and is reflected by the PBS. The reflected light passes through a projecting lens, thereby obtaining an enlarged video image.

An optical unit in the disclosure is L-shaped as a whole. In the optical unit, a distance between the projecting lens and the liquid crystal panel is long and a product set is increased in size.

Further, in the liquid panel used for a projection-type video display apparatus, the response time of liquid crystal is long. Therefore, in the conventional projection-type video display apparatus for switching polarizing rotation control elements for R-, G-, and B-light which sequentially project the R-light, the G-light, and the B-light onto the overall screen of the liquid crystal panel, there is a problem in that the use efficiency of light is degraded.

SUMMARY OF THE INVENTION

It is one object of the present invention to provide a projection-type video display technique according to which, an apparatus becomes compact and contrast is improved.

It is another object of the present invention to provide a novel and advantageous projection-type video display technique according to which, the use efficiency of light is improved.

To solve the above objects of the present invention, according to the present invention, there is provided a video display apparatus comprising: an optical source unit for radiating light; polarization converter for matching light, which is outputted by the light source unit, to one of S polarizing light and P polarizing light; an optical characteristics switching element for electrically and periodically switching a wavelength band of light outputted by the polarization converter; a video display element, as light valve element, for forming an optical image from the light outputted by the light source unit, in accordance with a video signal; radiating device for radiating light to the video display element; and projector for projecting light outputted by the video display element. Preferably, the video display apparatus may further comprise a light path changing element and, accordingly, a light path from the light source unit to the projector may be U-shaped.

DESCRIPTION OF THE PREFERRED EMBODIMENTS

Hereinbelow, embodiments of the present invention will be described with reference to the drawings.

First, before explaining the present invention, a description is given of the principle of an electronic time-division optical characteristics switching element (hereinafter, referred to as an optical characteristics switching element) with reference to FIG. 26.

Figure 26:
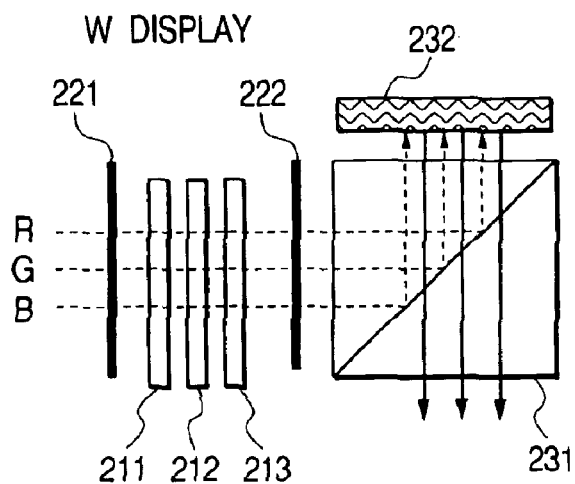
FIG. 26 is a second schematic diagram for explaining the principle of the optical characteristics switching element.

FIG. 26 is a schematic diagram for explaining the principle of a optical characteristics switching element. Referring to FIG. 26, the optical characteristics switching element comprises an R polarizing rotation control element 211, a G polarizing rotation control element 212, a B polarizing rotation control element 213, polarizing plates 221 and 222. Reference symbol 231 denotes a polarization beam splitter (hereinafter, simply referred to as a PBS), and reference symbol 232 denotes a reflection-type liquid crystal panel. As shown in FIG. 26, if the PBS 231 is arranged at the back of the optical characteristics switching elements, the polarizing plate 222 is not necessarily required. If no voltage is applied to the R polarizing rotation control element 211, the G polarizing rotation control element 212, and the B polarizing rotation control element 213, light polarizing axes of specific wavelength bands are converted. On the contrary, if a voltage is applied to the R polarizing rotation control element 211, the G polarizing rotation control element 212, and the B polarizing rotation control element 213, the R-light, the B-light, and the G-light are outputted without changing the light polarizing axes of the specific wavelength bands. In FIG. 26, for example, the voltage is applied to the R polarizing rotation control element 211 and no voltage is applied to the G polarizing rotation control element 212 and the B polarizing rotation control element 213, the R-light, as the S polarizing light, without being changed is transmitted through the R-, G-, and B- polarizing rotation control elements 211, 212, and 213 and is incident on the PBS 231. On the other hand, since the G- and B-lights as the S polarizing light are converted into the P polarizing light by the G polarizing rotation control element 212 and the B polarizing rotation control element 213, they are not transmitted through the PBS 222. Therefore, the R-light is incident on the PBS 231, is reflected to a PBS film, and is incident on the liquid crystal panel 232. If white light is displayed by using a video signal, the liquid crystal panel 232 converts the white light into the P polarizing light, the P polarizing light after the conversion is transmitted through the PBS 231, and is emitted. By sequentially applying the voltages to the G polarizing rotation control element 212 and the B polarizing rotation control element 213, the G- and B-lights as the P polarizing light are transmitted through the PBS 231 and are outputted. Then, the R-, G-, and B-lights are sequentially projected onto the screen through a projecting lens (not shown). Since a period for the above switching is short, the R-, G-, and B-lights are felt as white on the human's eyes.

Although it is assumed in the above description that the S polarizing light is incident on the optical characteristics switching element, the P polarizing light may be incident. In this case, the P polarizing light is transmitted through the polarizing rotation control element to which no voltage is applied, thereby being converted into the S polarizing light, and is not incident on the PBS 231.

Figure 1:
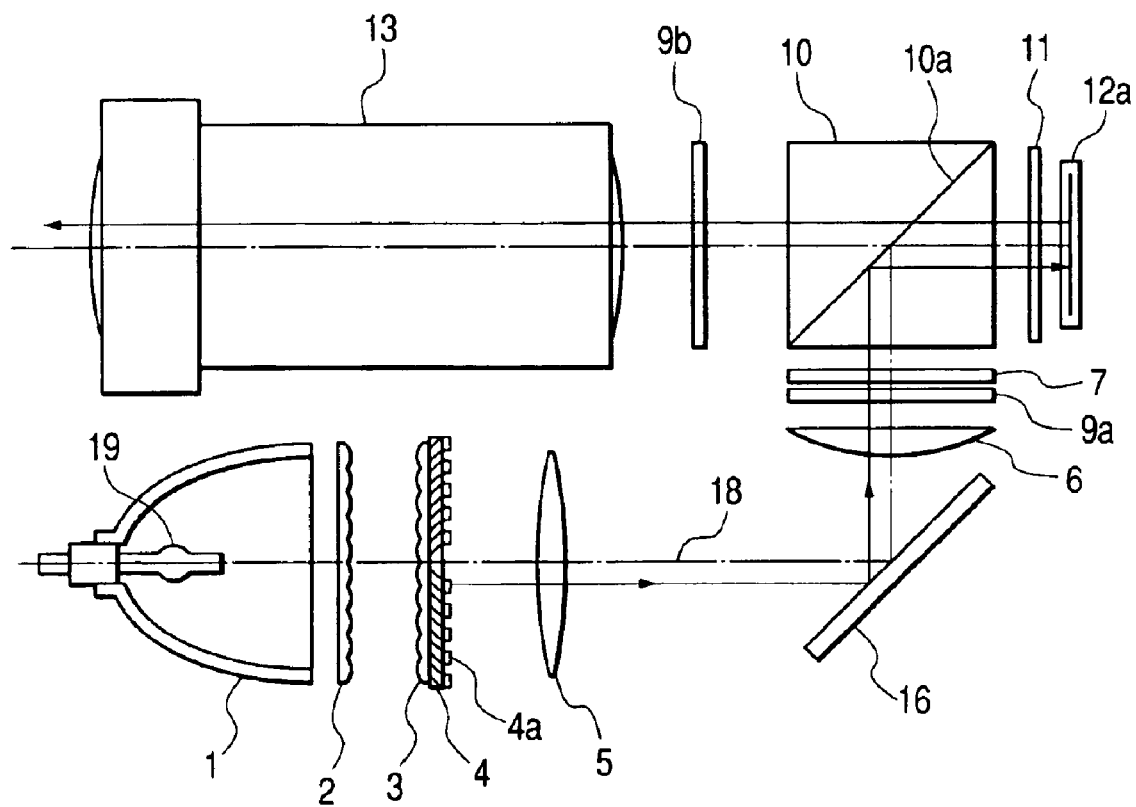
FIG. 1 is a schematic diagram showing the structure of an optical unit for a projection-type video display apparatus according to a first embodiment of the present invention.

FIG. 1 is a schematic diagram showing the structure of an optical unit for a projection-type video display apparatus according to a first embodiment of the present invention.

Referring to FIG. 1, a lamp for emitting light comprises a light source 19 and a reflector 1. Reference symbol 2 denotes a first lens array, reference symbol 3 denotes a second lens array, reference symbol 4 denotes a PBS, reference symbol 4a denotes a λ/2 phase difference plate, reference symbol 5 denotes a condenser lens (collimator lens), reference symbol 14 denotes a reflecting mirror, reference symbol 6 denotes a condenser lens, reference symbol 7 denotes a optical characteristics switching element, and reference symbol 9a denotes a polarizing plate. Reference symbol 10 denotes a cuboid-shaped PBS comprising a PBS film 10a. Reference symbol 11 denotes λ/4 phase difference plate, reference symbol 12a denotes a reflection-type liquid crystal panel for forming an optical image in accordance with the video signal, reference symbol 9b denotes a polarizing plate, and reference symbol 13 denotes a projecting lens. In first to thirteen embodiments, the cuboid-shaped PBS may be replaced with a flat PBS.

According to the first embodiment, in the projection-type video display apparatus, light radiated from the light source 19 is condensed to the reflector 1 having an elliptical plane, a parabolic plane, or an a spherical plane. The condensed light is incident on the first array lens 2 comprising a plurality of condenser lens cells provided for a rectangular frame having substantially the same size as that of the opening for emission of the reflector 1 as the reflecting mirror, which condenses the light outputted by the reflector 1 and forms a plurality of secondary light-source images. Further, the light passes through the second array lens 3 comprising a plurality of condensing lens cells, provided near a portion at which the plurality of secondary light-source images are formed, which forms the individual lens images though the first array lens 2 onto the reflection-type liquid crystal panel 12a.

Hereinbelow, functions of the first and second array lenses 2 and 3 will be described. Generally, in the distribution of illumination after the light emission from the reflector 1, the illumination is low at the peripheral portion thereof and it is higher near the center thereof. However, in the center, the light is vignetted by a pole of a bulb and, therefore, the illumination is low. The first and second array lenses 2 and 3 have a function for finely separating the distribution of the illumination after the light emission from the reflector 1 and for collecting the separated illumination, thereby obtaining a uniform distribution of illumination on the reflection-type liquid crystal panel 12a.

The emitted light is incident on the PBS 4 comprising arrays of rhombic prisms having substantially half size of each of lens arranged to match a pitch of the optical axes of lenses comprising the second array lens 3, in the horizontal direction. A PBS film is formed on the plane of the prism, and the incident light is split into the P polarizing light and the S polarizing light through the PBS film. The P polarizing light advances straightly through the PBS film and a polarizing direction thereof is rotated by 90° by using the $\lambda/2$ phase difference plate 4a provided for an output plane of the prism. Then, the light is converted into the S polarizing light and is outputted. On the other hand, the S polarizing light is reflected to the PBS film, is reflected to the adjacent rhombic prism in the original optical axis again, and is outputted as the S polarizing light.

The output light is transmitted through the condenser lens 5, is reflected to the reflecting mirror 16, is transmitted through the condenser lens 6, and is incident on the polarizing plate 9a. The purity of specific polarization is increased by using the polarizing plate 9a and, then, is incident on the optical characteristics switching element 7 for the R-, G-, and B-lights.

As mentioned above, the optical characteristics switching element 7 periodically switches the light wavelength bands. Of the output light of the optical characteristics switching element 7, the R-light is converted into the S polarizing light and the G- and B-lights are converted into the P polarizing light at one timing. The B-light is converted into the S polarizing light and the R- and G-lights are sequentially converted into the P polarizing light at another timing. The G-light is converted into the S polarizing light and the B- and R-lights are converted into the P polarizing light at further another timing. The three converted statuses are periodically switched.

Thereafter, the specific optical axis, that is, only the S polarizing light is reflected and the P polarizing light is incident on the cuboid-shaped PBS 10 covered with the PBS film 10a through which the P polarizing light is transmitted. Thereby, only the R-light as the S polarizing light is reflected at one timing, only the B-light is sequentially reflected at another timing, and only the G-light is sequentially reflected. In this case, the P polarizing light as unnecessary light is transmitted through the PBS film 10a and is not incident on the reflection-type liquid crystal panel 12a. As mentioned above, after the time-division color separation, the light is radiated to the reflection-type liquid crystal panel 12a. The $\lambda/4$ phase difference plate 11 for improving the contrast based on the phase compensation is arranged in front of the reflection-type liquid crystal panel 12a.

A liquid crystal display unit corresponding to the number of display pixels, for example, <(1024 pixels in landscape)× (768 pixels in portrait)> is provided for the reflection-type liquid crystal panel 12a. A drive circuit drives the reflection-type liquid crystal panel 12a based on a video signal which is externally inputted. The radiated light is modulated in accordance with the video signal and is outputted again to the PBS 10 as reflected light. The amount of light outputted to the projecting lens 13 and the amount of light outputted to the light source 19 are determined depending on a relationship between the polarized status of the light and the polarizing axes of the PBS film 10a in the case of the transmission and the reflection. As mentioned above, an image is projected in accordance with the external input video signal. Of the light outputted by the reflection-type liquid crystal panel 12a, the P polarizing light is transmitted through the PBS film 10a and, then, is incident on the projecting lens 13 through the polarizing plate 9b for improving the contrast due to the increase in degree of polarization. In this case, when black is displayed on the reflection-type liquid crystal panel 12a, with respect to the polarizing direction, the light is the S polarizing light equivalent to the incident light and, therefore, the cuboid-shaped PBS 10 returns the light to the light source 19 side along an incident light path.

Thereafter, the light as the video signal passes through, for example, a projecting lens 20 as a zoom lens and reaches a screen. Through the projecting lens 20, the image formed on the reflection-type liquid crystal panel 12a is enlarged and projected on the screen and functions as a video liquid crystal display apparatus. In the video liquid crystal display apparatus, a drive circuit, which will be described later, drives the light source 19, the reflection-type liquid crystal panel 12a, and the optical characteristics switching element 7.

According to the first embodiment, as shown in FIG. 1, the optical axis 18 from the reflector 1 to the projecting lens 13 is U-shaped. In other words, the optical direction from the reflector 1 is substantially in parallel to the optical direction from the projecting lens 13, they are mutually in the opposite direction, and an optical unit is arranged in the direction obtained by bending the optical axis 18 twice. Consequently, the external size of the optical unit is miniaturized with the structure of the same units. Simultaneously, the external size of the product set can further be reduced.

Figure 2:
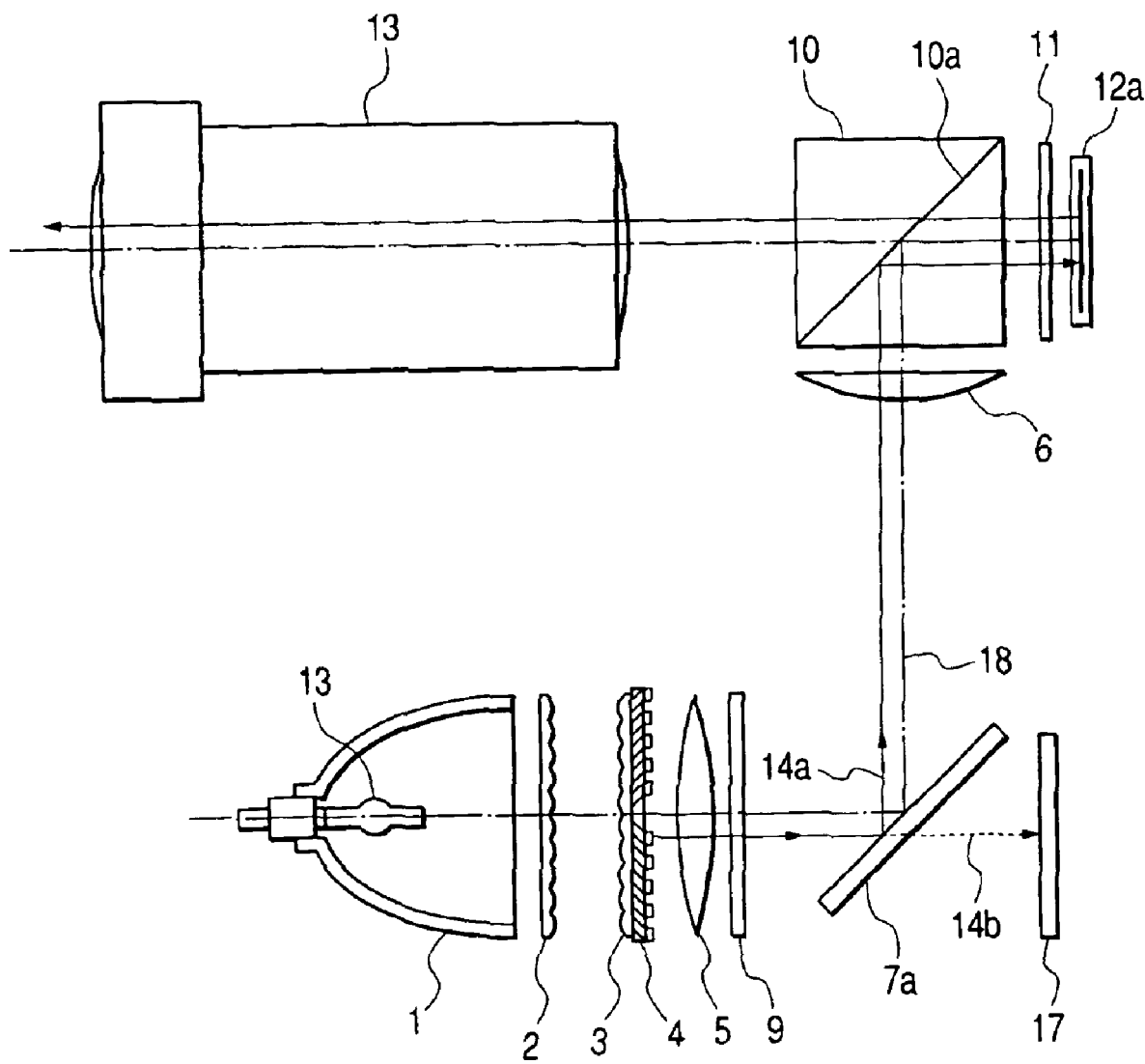
FIG. 2 is a schematic diagram showing the structure of an optical unit for a projection-type video display apparatus according to a second embodiment of the present invention.

FIG. 2 is a schematic diagram showing the structure of an optical unit for a projection-type video display apparatus according to a second embodiment of the present invention. Referring to FIG. 2, portions similar to those in FIG. 1 are designated by the same reference symbols and the description thereof is omitted.

Although the transmission-type optical characteristics switching element is used in FIG. 1 according to the first embodiment, a reflection-type optical characteristics switching element is used according to the second embodiment. A reflection-type optical characteristics switching element 7a separates colors by using light diffraction. The reflection-type optical characteristics switching element 7a separates colors into ON-light 14a and OFF-light 14b, and emits this light in different directions, respectively. The ON-light 14a shown by a continuous line is reflected to the optical characteristics switching element 7a and is outputted to a light path reaching the reflection-type liquid crystal panel 12a. The OFF-light 14b shown by a dotted line is transmitted through the optical characteristics switching element 7a, and is outputted a black shielding plate 17 for preventing the decrease in contrast.

According to the second embodiment, optical characteristics switching element 7a which performs reflection-type electronic color separation etc. is used for a light-path bending portion. Therefore, similarly to the first embodiment, the optical axis from the reflector 1 to the projecting lens 13 is U-shaped, that is, the optical direction from the reflector 1 is substantially in parallel to the optical direction from the projecting lens 13, and they are mutually in the opposite direction. An optical unit is arranged in the direction obtained by bending the optical axis 18 twice. Consequently, the external size of the optical unit is miniaturized with the structure of the same parts. Simultaneously, the external size of the product set can further be reduced.

Figure 3:
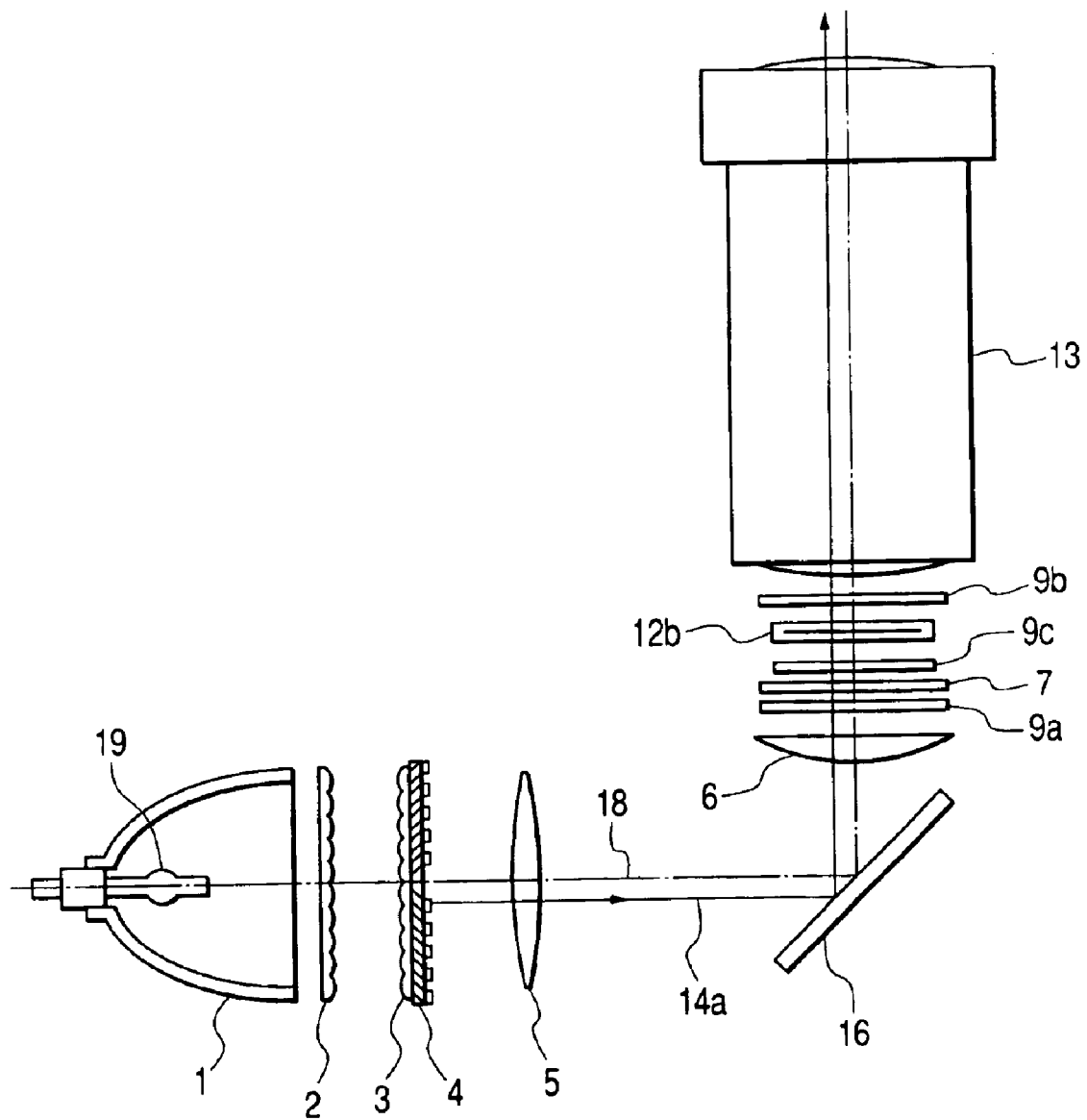
FIG. 3 is a schematic diagram showing the structure of an optical unit for a projection-type video display apparatus according to a third embodiment of the present invention.

FIG. 3 is a schematic diagram showing the structure of an optical unit for a projection-type video display apparatus according to a third embodiment of the present invention. Referring to FIG. 3, portions similar to those in FIGS. 1 and 2 are designated by the same reference symbols and the description thereof is omitted.

According to the third embodiment, a light path is L-shaped. The polarizing plates 9a and 9c and the optical characteristics switching element 7 perform color separation because the PBS is not provided in the light path subsequent thereto. The optical characteristics switching elements is provided on the output side of the condenser lens 6. The polarizing plate 9c cuts OFF-light in a different polarizing direction. A transmission-type liquid crystal panel 12b is provided as a video display element. In the optical characteristics switching element 7, by using the group of polarizing rotation control elements, the R-, G-, and B-lights are sequentially incident on the transmission-type liquid crystal panel 12b.

According to the third embodiment, the transmission-type liquid crystal panel 12b is used. Therefore, the PBS becomes unnecessary and, thus, the projection-type video display apparatus is reduced in weight. Since a distance between the transmission-type liquid crystal panel 12b and the projecting lens 13 is short and a back-focusing distance is also short, the projecting lens 13 is short and is reduced in weight. Accordingly, the size of the product set can be miniaturized.

Figure 4:
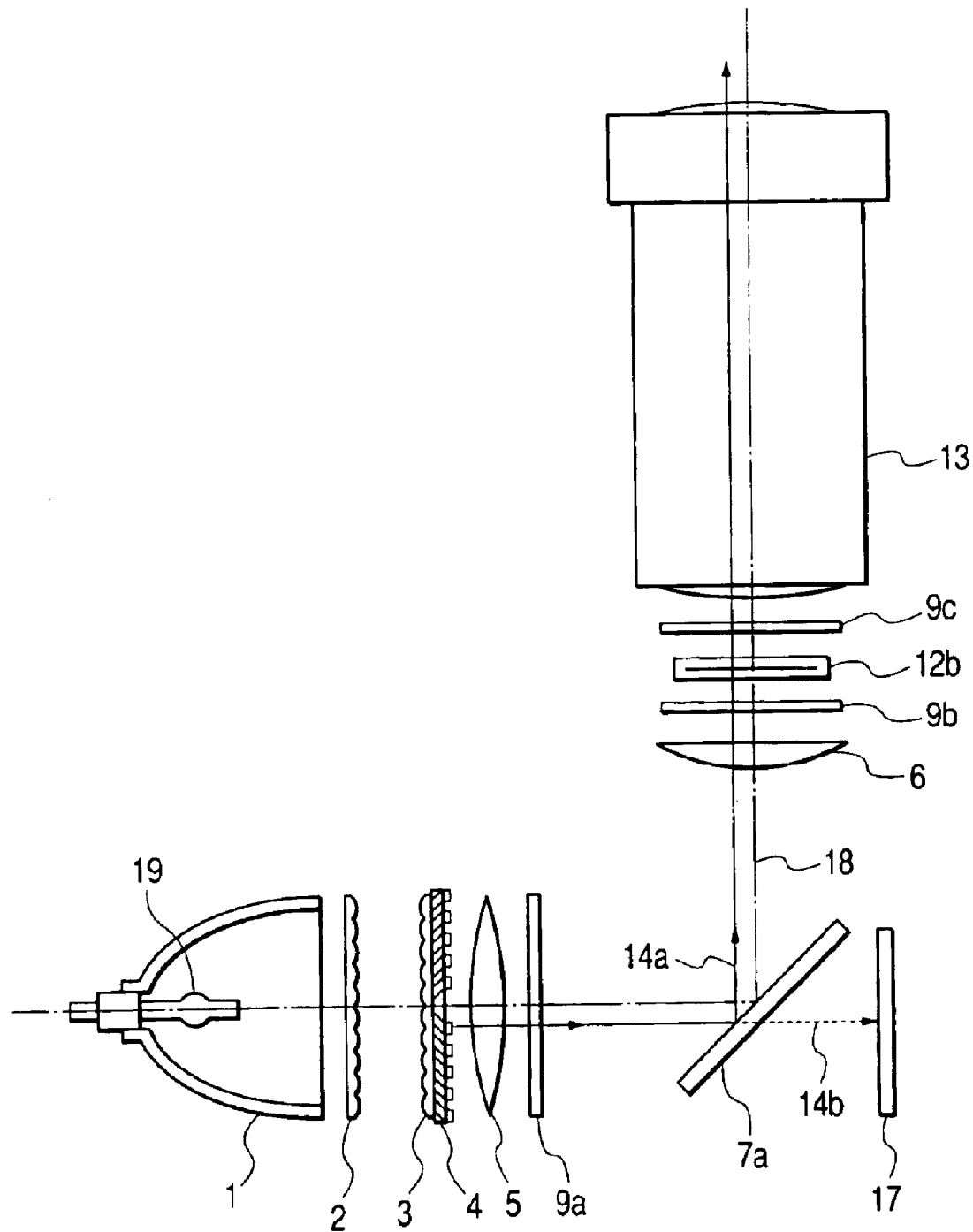
FIG. 4 is a schematic diagram showing the structure of an optical unit for a projection-type video display apparatus according to a fourth embodiment of the present invention.

FIG. 4 is a schematic diagram showing an optical unit for a projection-type video display apparatus according to a fourth embodiment of the present invention. Referring to FIG. 4, the reflection-type optical characteristics switching element 7a shown in FIG. 2 is used and ON-light, which is reflected, is incident on the projecting lens 13 through the transmission-type liquid crystal panel 12b. OFF-light is shielded by the shielding plate 17. The reflection-type optical characteristics switching element 7a is provided between the polarizing plate 9 and the condenser lens 6. A light path from the light source 19 is bent at a substantially right angle and is L-shaped. According to the fourth embodiment, the optical unit can be compact.

Figure 5:
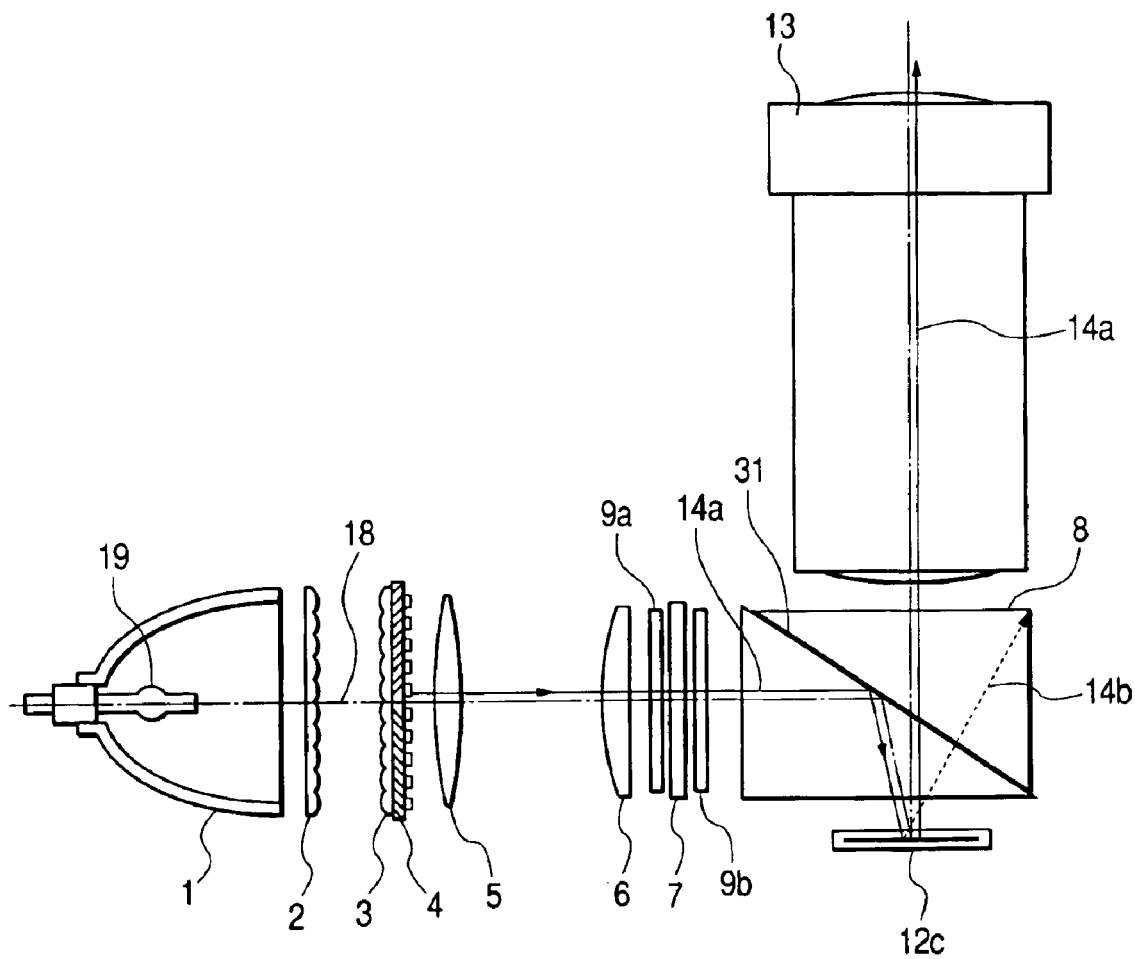
FIG. 5 is a schematic diagram showing the structure of an optical unit for a projection-type video display apparatus according to a fifth embodiment of the present invention.

FIG. 5 is a schematic diagram showing the structure of an optical unit for a projection-type video display apparatus according to a fifth embodiment of the present invention.

According to the fifth embodiment, polarizing plates 9a and 9b and the optical characteristics switching element 7 is provided on the output side of the condenser lens 6. The output light form the condenser lens 6 is incident on a TIR prism 8 as a total reflection prism. The light incident on the TIR prism 8 is reflected to a reflection preventing film 31 (such as an AR multi-coating), and is incident on a reflection-type micromirror video display element 12c. The reflection-type micromirror video display element 12c comprises a mirror composed of small pixel units, and can be rotated at an angle of substantially 30° by applying a voltage. The ON-light 14a is outputted in the optical axis direction of the projecting lens 13, and the OFF-light 14b is reflected so as not to be incident on the projecting lens 13. When black is displayed on a projection screen, the OFF-light 14b is used. When white or the like is displayed on the projection screen, the ON-light 14a is used. When gray is displayed on the projection screen, the gradation of brightness can be controlled by switching a period of time for the ON-light 14a and that for the OFF-light 14b.

The reflection-type micromirror video display element 12c rotates a micromirror by electrostatic force, and fast switches the ON-light 14a and the OFF-light 14b, thus preventing the loss of switching time.

Figure 6:
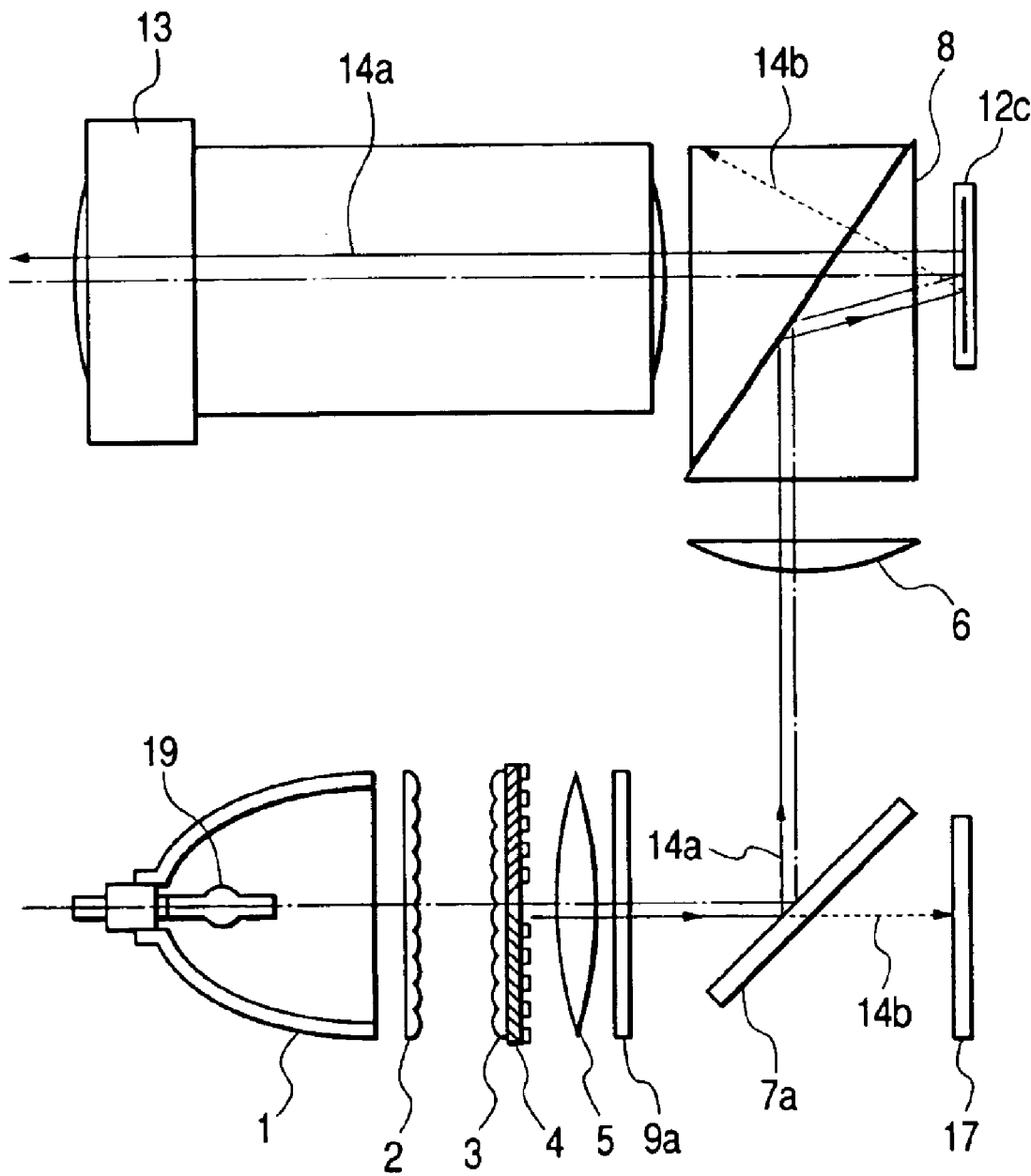
FIG. 6 is a schematic diagram showing the structure of an optical unit for a projection-type video display apparatus according to a sixth embodiment of the present invention.

FIG. 6 is a schematic diagram showing an optical unit for a projection-type video display apparatus according to a sixth embodiment of the present invention.

According to the sixth embodiment, the reflection-type optical characteristics switching element 7a is used. The reflection-type micromirror video display element 12c is used as a display element and a light path thereof is U-shaped. The reflection-type optical characteristics switching element 7a is provided between the polarizing plate 9a and the condenser lens 6. The total reflection prism 8 is provided on the output side of the condenser lens 6. The output light reflected to the total reflection prism 8 is incident on the reflection-type micromirror video display element 12c. In this optical system, the output light of the reflection-type optical characteristics switching element 7a has a function for executing operations similar the that in FIG. 6 according to the sixth embodiment, and switching time of the ON-light 14a and the OFF-light 14b is fast, thus reducing the loss of the switching time. The optical unit can be compact.

According to the first to sixth embodiments, in a so-called scroll method in which when the optical characteristics switching elements sequentially radiate R-, G-, and B-lights to the overall plane of the liquid crystal panel 12, that is, when the optical characteristics switching elements sequentially radiate the R-light, the G-light, and the B-light to the overall liquid crystal panel 12, although the light is not so accurately condensed to the liquid crystal panel 12, the R-light is radiated to one area corresponding to ⅓ of the liquid crystal panel 12, the G-light is radiated to another area corresponding to ⅓ of the liquid crystal panel 12, and the B-light is radiated to another area corresponding to ⅓ of the liquid crystal panel 12, that is, the radiated areas of the R-, G-, and B-lights are different, the light must be correctly condensed at the radiated area of the R-, G-, and B-lights. In other words, an image forming optical system for forming an image of the optical characteristics switching element 7 on the display element is necessary.

Hereinbelow, a description is given the structure with an image forming optical system for correctly forming an image at a predetermined area by improving image forming performance with reference to FIGS. 7A to 9.

Figures 7A, 7B, 7C:
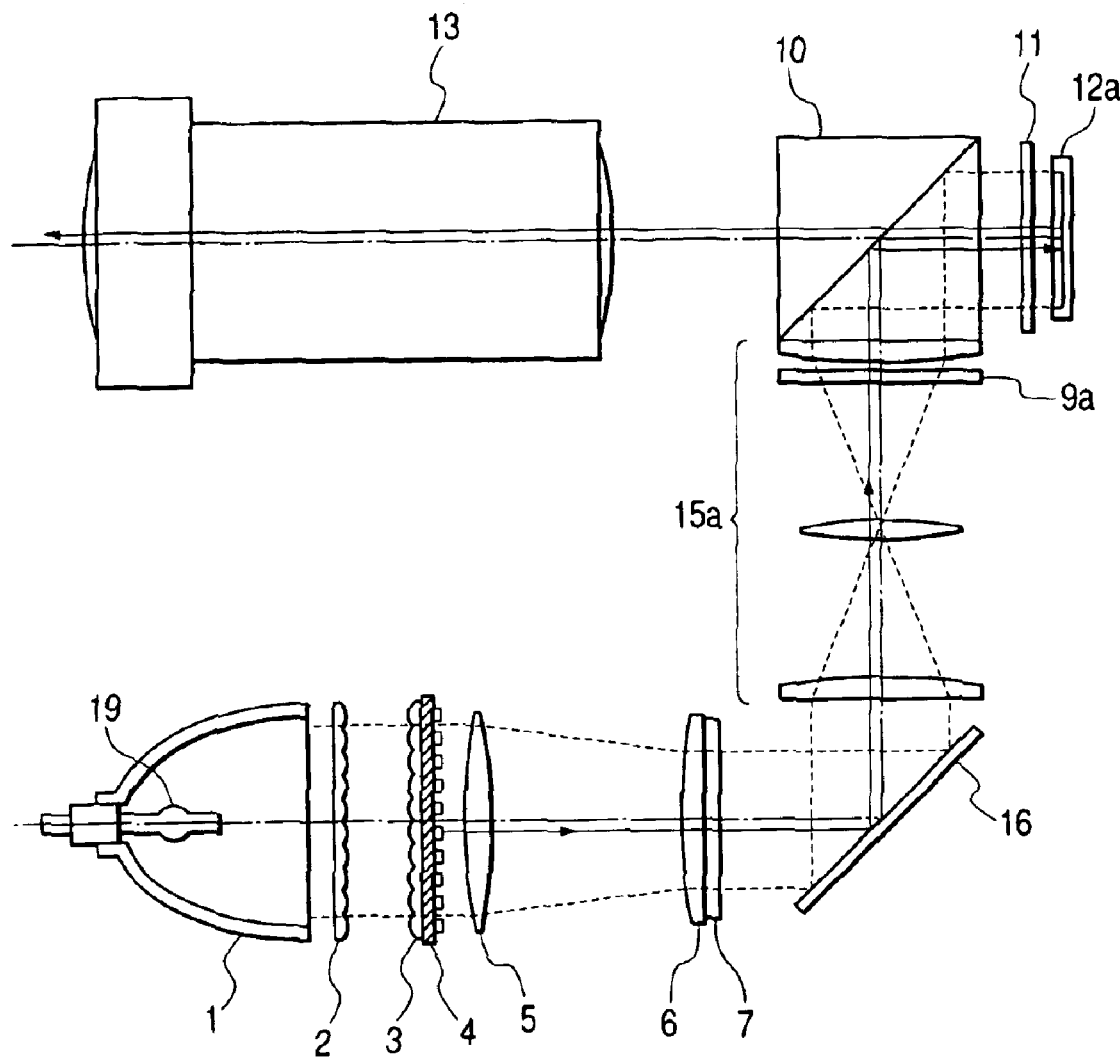
FIG. 7A is a schematic diagram showing the structure of an optical unit for a projection-type video display apparatus and FIGS. 7B and 7C are schematic diagrams showing light areas radiated on a liquid crystal panel, according to a seventh embodiment of the present invention.

FIG. 7A is a schematic diagram showing the structure of an optical unit for a projection-type video display apparatus according to a seventh embodiment of the present invention, and FIGS. 7B and 7C are schematic diagrams showing areas of light which is radiated on a liquid crystal display panel. According to the seventh embodiment, on optical characteristics switching element 7, a plurality of separated color lights are moved and displayed on different positions, and an image forming optical system 15 forms an image of the optical characteristics switching element 7 on a display element 12a.

According to the seventh embodiment, at one timing, as shown in FIG. 7B, the R-light is radiated at the top area of a screen of the liquid crystal panel, the G-light is radiated at the center area, and the B-light is radiated at the bottom area. At another timing, as shown in FIG. 7C, the B-light is radiated at the top area of a screen of the liquid crystal panel, the R-light is radiated at the center area, and the G-light is radiated at the bottom area. That is, when the areas at which the R-, G-, and B-lights are radiated, are sequentially changed, the images of the light radiated at the areas are formed so as to prevent the radiated light from being out of the radiated areas and it is important the ununiformity of colors are prevented.

According to the seventh embodiment, to improve the image forming performance, the S polarizing light as output light from the optical characteristics switching elements 7 is reflected to the reflecting mirror 16, through an image forming optical system 15a, and it is incident on the PBS 10. The incident light is reflected to the PBS film 10a, and is incident on the reflection-type liquid crystal panel 12a through the λ/4 phase difference plate 11. By using the image forming optical system 15a which is properly designed, the R-light, the G-light, and the B-light of the image on the optical characteristics switching element 7 are condensed, with small aberration, at the top area, the center area, and the bottom area of the reflection-type liquid crystal panel 12a, and is formed on the reflection-type liquid crystal panel 12a as the display element.

According to the seventh embodiment, the optical characteristics switching element 7 time-sequentially changes electric control conditions at a plurality of positions corresponding to the scanning direction of the reflection-type display panel 12a, thereby time-sequentially multiplying and radiating a plurality of color light on the display element. It is assumed that the optical characteristics switching element 7 acts on the R-, G-, and B-lights and the number n of the plane of the optical characteristics switching element 7 is divided into n, like a line, in the landscape direction. In this case, in a first period, a voltage is sequentially applied or is not applied in descending order, thereby outputting the R-light. After the area of the R-light corresponds to substantially ⅓ of the optical characteristics switching element 7, i.e., an n/3-th area, the output of the R-light is sequentially moved down with a width of substantially ⅓ on the display element. From the top area of the optical characteristics switching element 7 after the movement of the area of the R-light, the G-light is outputted based on, for example, the polarization control of the optical characteristics switching element 7. The optical characteristics switching element 7 may be a wavelength-selecting-type reflection control element. In this case, if, in place of the reflecting mirror 16, the wavelength-selecting-type reflection control element is arranged and a reflection unit is arranged on the light path, it is possible to obtain functions equivalent to those of the optical characteristics switching element 7.

Similarly, a voltage is sequentially applied or is not applied in descending order, thereby outputting the G-light. After the area of the G-light corresponds to substantially ⅓ of the optical characteristics switching element 7, i.e., an n/3-th area, the output of the G-light is moved down with a width of substantially ⅓ on the display element. In this case, the B-light is outputted at the top area of the optical characteristics switching element 7. From the top area of the optical characteristics switching element 7, the R-light, the G-light, or the B-light is alternately outputted. The image forming optical system 15 forms images of the R-, B-, and G-light lines, displayed on the optical characteristics switching element 7, on the reflection-type display element 12a. In this case, in place of the combination of the R-light, the G-light, and the B-light, the combination of other color light, for example, cyan, yellow, and magenta may be combined. Alternatively, the R, G, B, and W (white) may be combined. Although the light is switched every n/3 line in the above example, the light may be switched every n/M (M is integer equal to n or less) line. According to the seventh embodiment, as one example, the image forming optical system 15 comprises at least three lenses for forming the images of the R-, B-, and G-light lines, displayed on the optical characteristics switching element 7, on the reflection-type display element 12a as the display element through a relay lens system. Further, the image forming optical system 15 comprises a telecentric optical system. The image forming optical system 15 is not necessarily three lenses or not the relay lens system for inverse. Preferably, an illumination system comprising the collimator lens 5 and the condenser lens 6 is a telecentric system and the optical axes of the light passing through the optical characteristics switching element 7 may be in parallel thereto. The optical characteristics switching element 7 may be attached to the condenser lens 6 or be attached to a first lens of the image forming optical system 15. The polarizing plate 9a may be arranged just in front of the PBS 10, and the optical characteristics are likely to be improved when the polarized plate 9a is arranged at the back of parallel light through by the telecentric image forming optical system 15. The S polarizing light in the light path can be set to match characteristics thereof to characteristics of the P polarizing light. In this case, the S polarizing light in the light path can be transmitted through the PBS 10 and can be incident on the liquid crystal panel. However, if characteristics of the contrast are regarded, the ½λ phase plate can be arranged in the front of or behind the polarizing plate 9a and the light can be reflected to the PBS 10 and can be incident on the liquid crystal panel.

According to the seventh embodiment, the use efficiency of the light can be improved and the screen can be bright. Other functions and advantages are substantially the same as those according to the first to the sixth embodiments.

Figure 8:
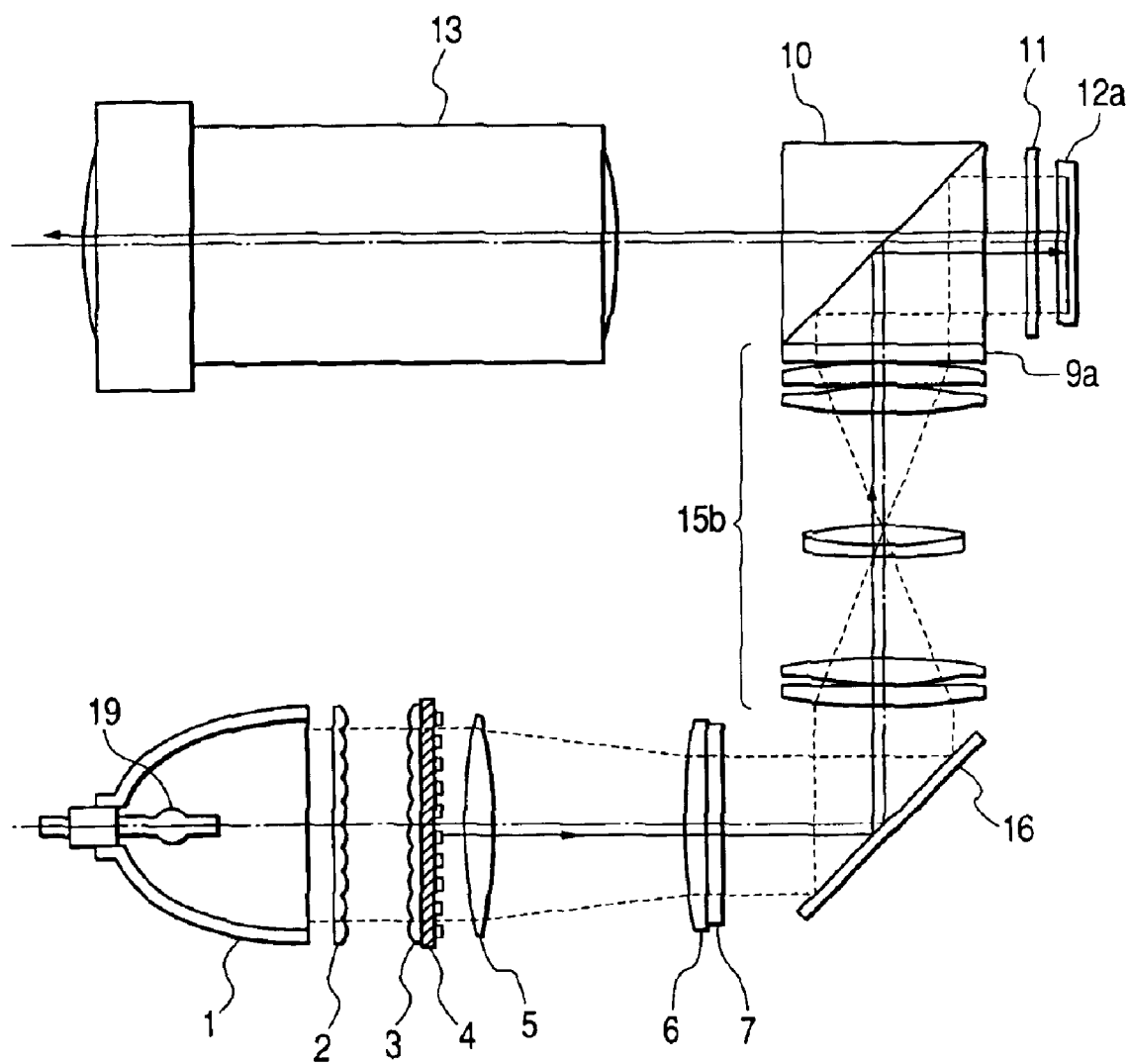
FIG. 8 is a schematic diagram showing the structure of an optical unit for a projection-type video display apparatus according to an eighth embodiment of the present invention.

FIG. 8 is a schematic diagram showing the structure of an optical unit for a projection-type video display apparatus according to an eighth embodiment of the present invention. In place of the image forming optical system 15a in FIG. 7 according to the seventh embodiment, an aspherical image forming optical system 15b using an aspherical lens is used. According to the eighth embodiment, the image forming performance of the image forming optical system 15 in the seventh embodiment can further be improved. Therefore, a clear image of the optical characteristics switching element 7 can be obtained on the display element 12a. Rising time for writing a signal can be reduced. If aberration performance equivalent to that of a spherical lens or more is obtained, it is advantageous that the length of the light path can be reduced, the number of lenses can be reduced, and weight can be reduced, and the like. In place of the aspherical lens, a plastic lens, a hybrid lens, or the like may be used.

To improve color aberration, an achromatic lens may be used. According to the eighth embodiment, the amount of aberration is smaller than that of the seventh embodiment in FIG. 7 and the R-, G-, and B-lights can be condensed at the areas and can the image thereof be formed.

Figure 9:
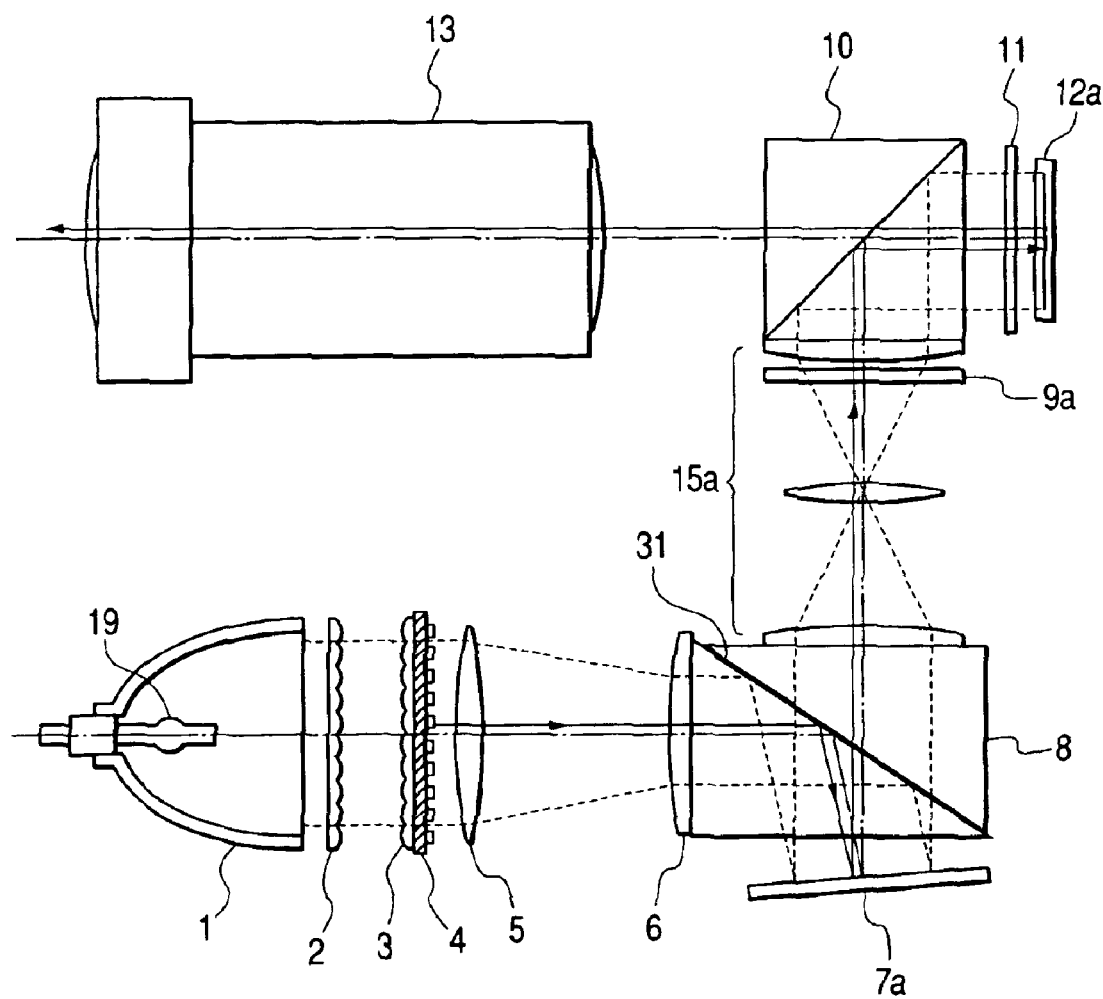
FIG. 9 is a schematic diagram showing the structure of an optical unit for a projection-type video display apparatus according to a ninth embodiment of the present invention.

FIG. 9 is a schematic diagram showing an optical unit for a projection-type video display apparatus according to a ninth embodiment of the present invention. The ninth embodiment uses the reflection-type optical characteristics switching element 7a for selectively controlling the reflection in accordance with the light wavelength. The light incident on the reflection-type optical characteristics switching element 7a via the total reflection prism 8 and the light outputted by the reflection-type optical characteristics switching element 7a pass through the total reflection prism 8. In other words, a reflecting angle of the total reflection prism 8 is optimized so that an incident angle and an output angle to/from the reflection-type optical characteristics switching element 7 at both the angles sandwich a critical angle. Consequently, the light path from the light source 19 is bent by substantially 90°. According to the ninth embodiment, the output light through the condenser lens 6 is incident on the total reflection prism 8, and the light reflected to a reflection preventing film 31 is radiated to the reflection-type optical characteristics switching element 7a. The reflected light (S polarizing light) is transmitted through the total reflection prism 8 and passes through the image forming optical system 15a, and is incident on the cuboid-shaped PBS 10. The S polarizing light reflected to the PBS film 10a of the cuboid-shaped PBS 10 is reflected to the reflection-type liquid crystal panel 12a. The reflected light becomes the P polarizing light, is transmitted through the cuboid-shaped PBS 10, and is incident on the projecting lens 13, when the video signal displays white.

The structure of the ninth embodiment is accomplished by further improving that shown in FIG. 4, of the fourth embodiment. According to the fourth embodiment, the reflection-type polarizing rotation control element 7a reflects the light substantially at a right angle. In this case, an incident angle, itself, to the polarizing rotation control element 7a is large. An incident angle and an output angle of the light radiated to the top area of the polarizing rotation control element 7a (to an upper edge in FIG. 4) are greatly different from an incident angle and an output angle of the light, radiated to the lower edge, of the reflection-type optical characteristics switiching element 7a. When the light is emitted from the reflection-type optical characteristics switiching element 7a and is incident on the liquid crystal panel due to the difference of the input angles and the output angles, the color blur is caused at the right and left of the liquid crystal panel.

On the contrary, according to the ninth embodiment, the light is reflected to the total reflection prism 8 and is incident on the reflection-type optical characteristics switiching element 7a. Therefore, the incident angle and the output angle to the reflection-type optical characteristics switiching element 7a can be reduced. A large part of the reflected light of the optical characteristics switiching element 7a is designed so that they are incident on the reflection preventing film 31 at an angle between the reflected light and the reflection preventing film 31, smaller than the critical angle in the case of the total reflection. Therefore, the light is efficiently transmitted through the reflection preventing film 31 and is incident on the image forming optical system 15a.

As mentioned above, since the incident angle and the output angle to the reflection-type optical characteristics switiching element 7a can be reduced, the effect of angle characteristics, that is, color blur can be reduced. The light is efficiently transmitted through the total reflection prism 8 and, consequently, the use efficiency of light can be improved.

According to the ninth embodiment, it is advantageous when the incident angle and the reflecting angle to the optical characteristics switching element 7a are smaller than 45°. When the incident angle and the reflecting angle are small, an overlapped portion of the light path is prolonged. When optical units such as lenses are arranged to the overlapped portion, there are limitations on design and arrangement of the optical units, such that a light path of a holding portion in the optical units is prevented from being vignetted and only the optical units are arranged without trouble even when the light passes twice, that is, upon an incident timing and a reflection timing. Therefore, the external size of the optical unit is increased. In the structure according to the ninth embodiment, the limitation on the design and the arrangement of the optical units are removed and the external size of the optical unit can be miniaturized. In accordance therewith, the external size of the product set can further be reduced. Further, the optical characteristics switching element 7 can be easily attached. In the structure according to the ninth embodiment, the incident light is incident on the optical characteristics switching element 7 at a small incident angle and the output light from the reflection plane or the diffraction plane is outputted at a small reflecting angle and, therefore, the optical characteristics switching element 7 can be used with preferable optical performance.

Further, according to the ninth embodiment, the output light of the total reflection prism 8 is incident on the reflection-type liquid crystal panel 12a via the image forming optical system 15a and, similarly with the seventh embodiment in FIG. 7, therefore, the R-, G-, and B-lights are not out of the top area, the center area, and the bottom area and is correctly condensed without aberration. Then, the image of the R-, G-, and B-light is formed.

FIGS. 10 to 12 show the structure in which an electronic optical characteristics switching element such as a hologram-type one, a diffraction grating, or a Fresnel lens is provided and a scroll method is used, according to a tenth embodiment of the present invention.

Hereinbelow, a description is given of the structure for scrolling, in which the R-light, the G-light, and the B-light are sequentially radiated at the top area, the center area, and the bottom area of the liquid crystal panel.

Figure 10A:
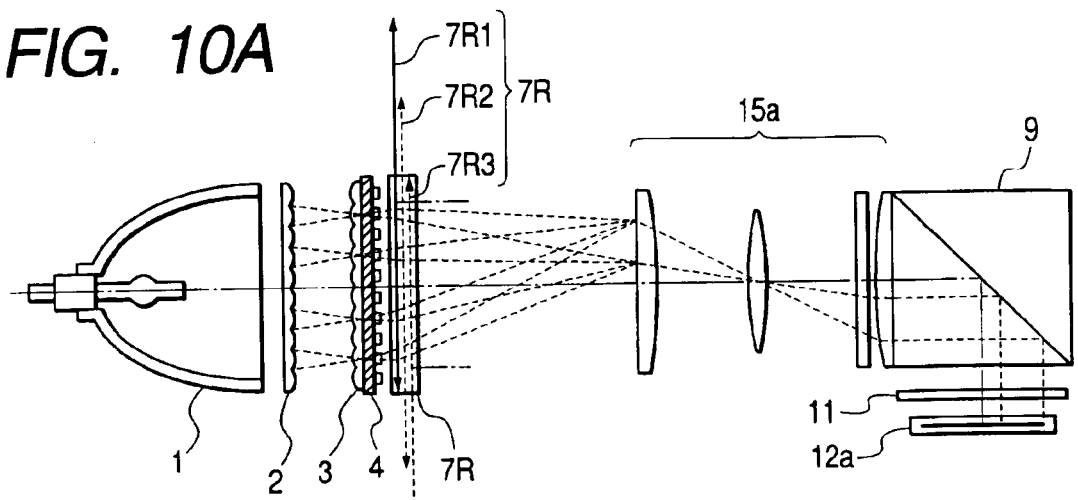
FIGS. 10A to 10C are schematic diagram s showing the structure of an optical unit for R-light, for a projection-type video display apparatus according to a tenth embodiment of the present invention.
Figure 10B:
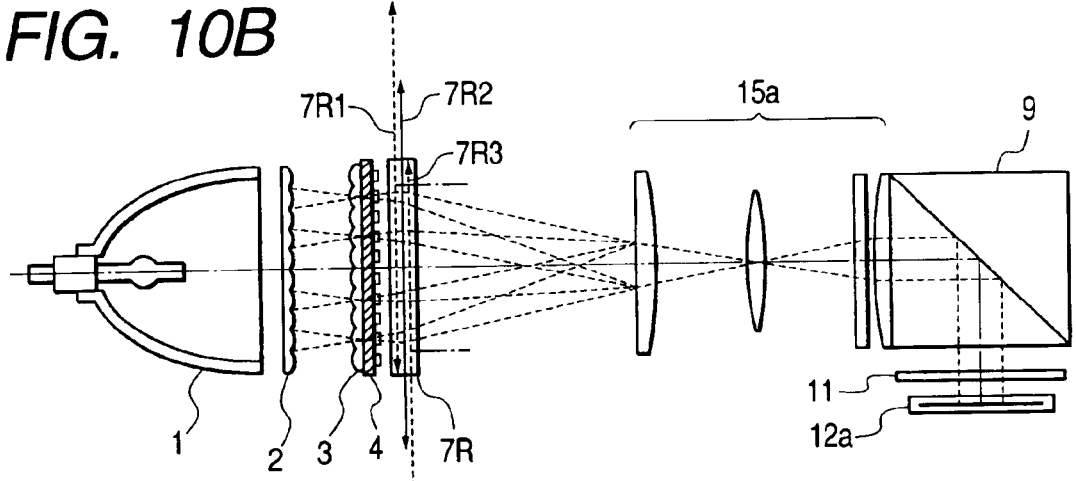
Figure 10C:
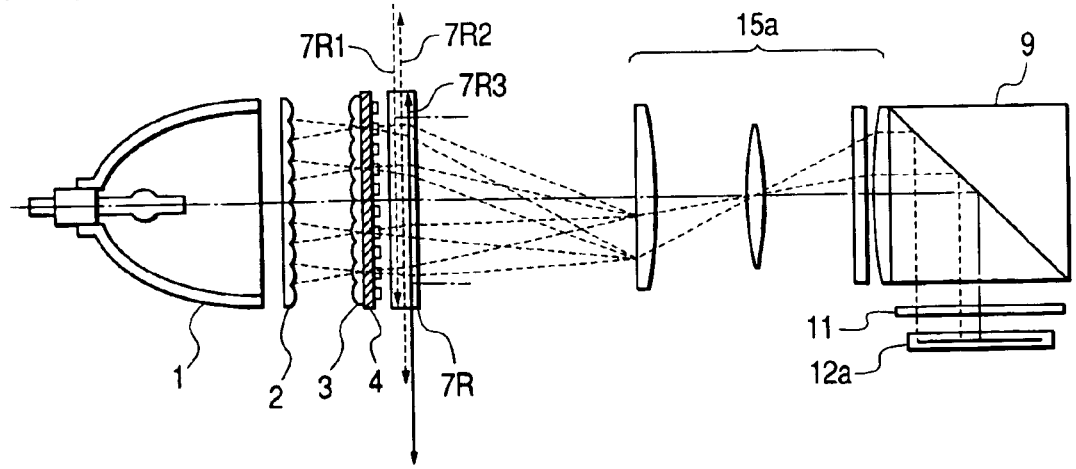

FIGS. 10A to 10C are schematic diagrams showing the structure of an optical unit for R-light, for a projection-type video display apparatus according to the tenth embodiment of the present invention. A description is given of a case of scrolling the R-light with reference to FIGS. 10A to 10C.

Figure 11A:
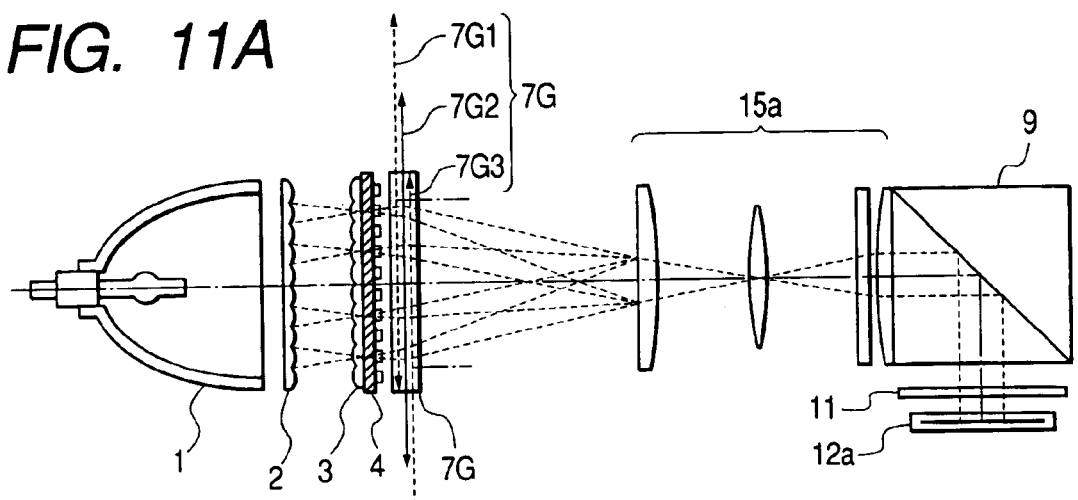
FIGS. 11A to 11C are schematic diagrams showing the structure of an optical unit for G-light, for a projection-type video display apparatus according to the tenth embodiment.
Figure 11B:
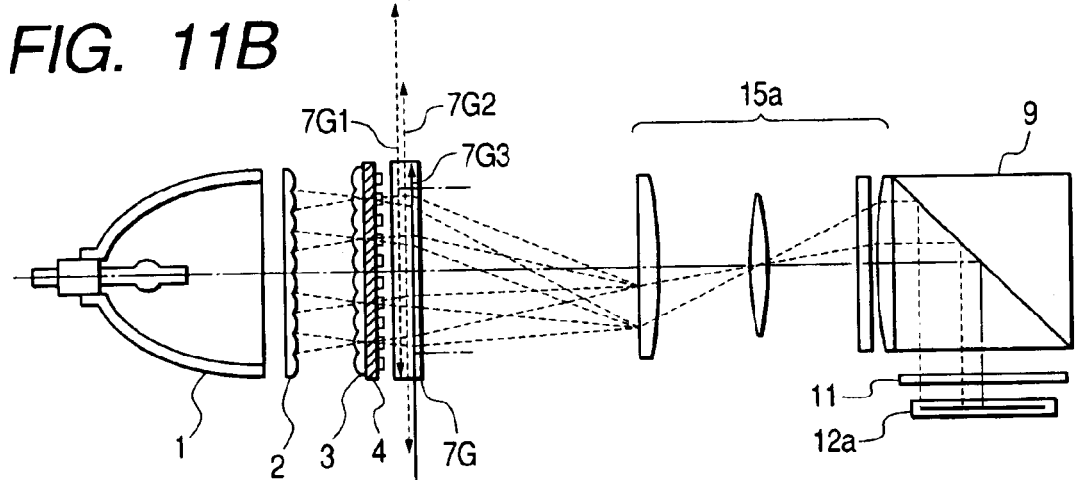
Figure 11C:
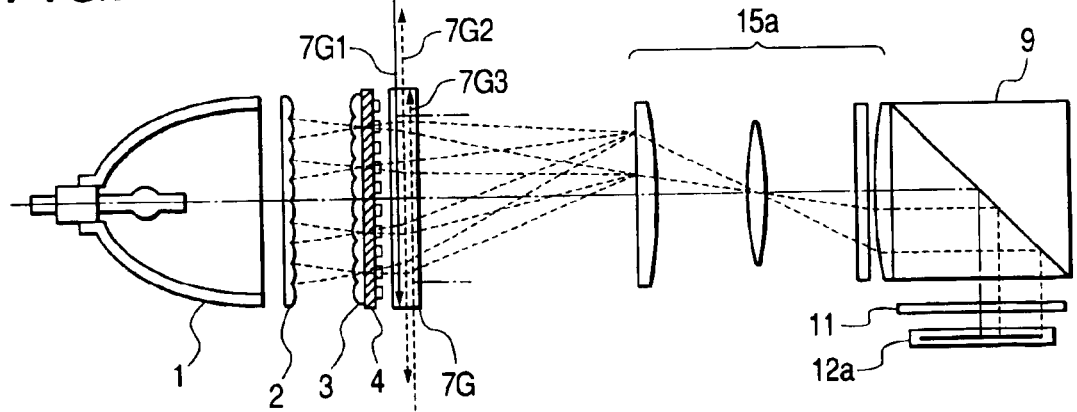

FIGS. 11A to 11C are schematic diagrams showing the structure of an optical unit for G-light, for a projection-type video display apparatus according to the tenth embodiment of the present invention. A description is given of a case of scrolling the G-light with reference to FIGS. 11A to 11C FIGS. 12A to 12C are schematic diagrams showing the structure of an optical unit for B-light, for a projection-type video display apparatus according to the tenth embodiment of the present invention. A description is given of a case of scrolling the B-light with reference to FIGS. 12A to 12C.

According to the tenth embodiment of the present invention, hologram-type optical characteristics switching elements using diffracted light is used. The hologram-type optical characteristics switching elements have a lens function. The hologram-type optical characteristics switching element for R-light uses three optical characteristics elements 7R1 to 7R3. In this case, the optical characteristics switching element 7R1 can change a condensing direction by the lens function or the diffraction so as to radiate the R-light at the top area (the R-area in FIG. 7B) of the reflection-type liquid crystal panel 12a. The optical characteristics switching element 7R2 can change a condensing direction by the lens function or the diffraction so as to radiate the R-light at the center area (the G-area in FIG. 7B) of the reflection-type liquid crystal panel 12a. The optical characteristics switching element 7R3 can change a condensing direction by the lens function or the diffraction so as to radiate the R-light at the bottom area (the B-area in FIG. 7B) of the reflection-type liquid crystal panel 12a. Also, the hologram-type optical characteristics switching element for G-light uses three optical characteristics elements 7G1 to 7G3. Further, the hologram-type optical characteristics switching element for B-light uses three optical characteristics elements 7B1 to 7B3.

In the hologram-type optical characteristics switching elements 7R1 to 7R3 for R-light, the hologram-type optical characteristics switching elements 7G1 to 7G3 for G-light, and the hologram-type optical characteristics switching elements 7B1 to 7B3 for B-light, a voltage is applied thereto and light is transmitted therethrough, and no voltage is applied and the optical axis of the specific wavelength band is changed by the lens function or the diffraction.

The hologram-type optical characteristics switching elements 7R1 to 7R3 for R-light, the hologram-type optical characteristics switching elements 7G1 to 7G3 for G-light, and the hologram-type optical characteristics switching elements 7B1 to 7B3 for B-light are overlappingly used.

Figure 12A:
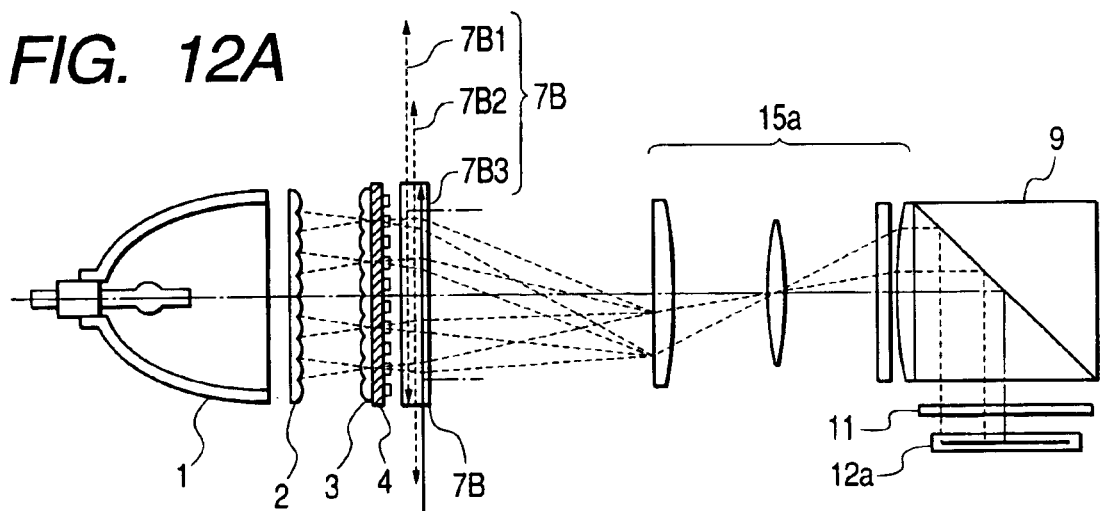
FIGS. 12A to 12C are schematic diagrams showing the structure of an optical unit for B-light, for a projection-type video display apparatus according to the tenth embodiment.
Figure 12B:
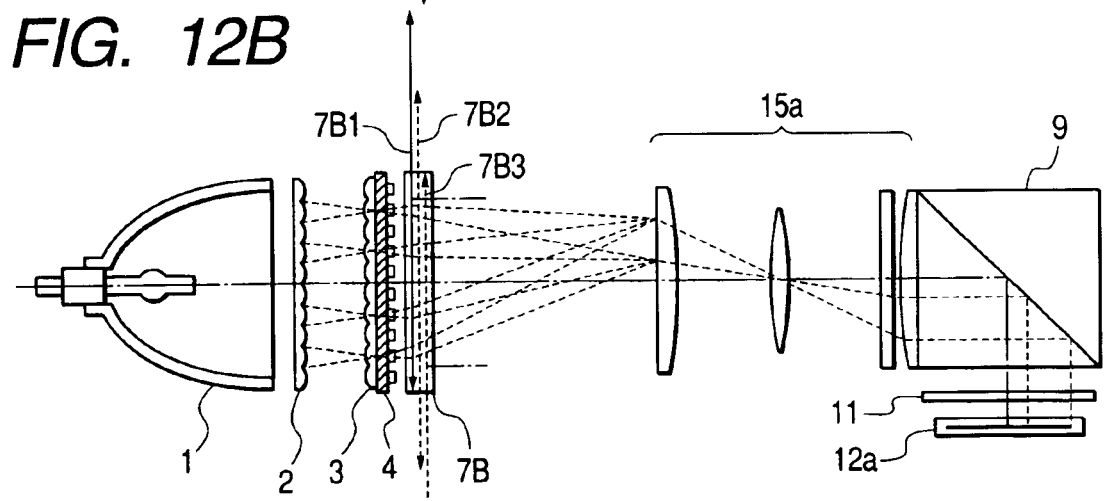
Figure 12C:
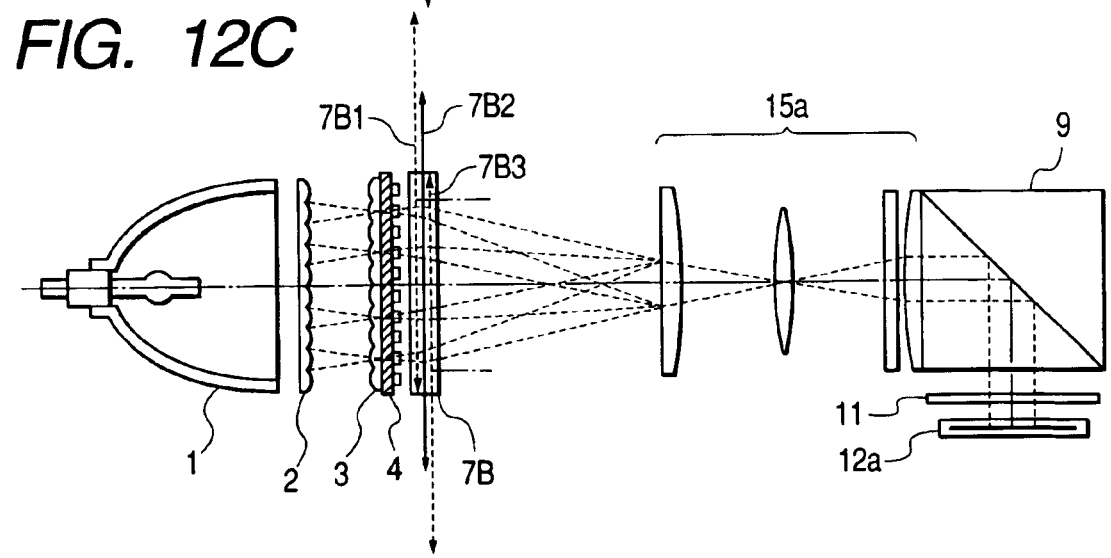

For the sake of the simple description, FIGS. 10A to 10C show the hologram-type optical characteristics switching elements for R-light 7R1 to 7R3 according to the tenth embodiment of the present invention, FIGS. 11A to 11C show the hologram-type optical characteristics switching elements 7G1 to 7G3 for G-light according to the tenth embodiment, and FIGS. 12A to 12C show the hologram-type optical characteristics switching elements for B-light 7B1 to 7B3 according to the tenth embodiment. In the case in which times t1, t2, and t3 sequentially pass, FIGS. 10A, 11A, and 12A show a status at the time t1, FIGS. 10B, 11B, and 12B show a status at the time t2, and FIGS. 10C, 11C, and 12C show a status at the time t3.

Referring to FIGS. 10A to 12C, the light from the light source 19 is converted into the S polarizing light by the PBS 4 and, thereafter, is incident on the hologram-type optical characteristics switching element for R-light 7R1 to 7R3, the hologram-type optical characteristics switching elements 7G1 to 7G3 for G-light, and the hologram-type optical characteristics switching elements 7B1 to 7B3 for B-light.

According to the tenth embodiment, the image forming optical system 15a is designed so that a plane of the light source of an incident lens is flat and an image is formed on the flat plane of the light source and the reflection-type liquid crystal panel 12a. In the reflection-type liquid crystal panel 12a, the top thereof is arranged to the light source side and the bottom thereof is arranged to the projecting lens. As a consequence, the image formed on the top area, the center area, and the bottom area of the flat plane of the incident lens corresponds to the image formed on the top area, the center area, and the bottom area of the video display element, respectively.

At the time t1, referring to FIG. 10A, of the hologram-type optical characteristics switching elements 7R1 to 7R3 for R-light, a voltage is applied to the hologram-type optical characteristics switching elements 7R2 and 7R3 for R-light. However, no voltage is applied to the hologram-type optical characteristics switching element 7R1 for R-light. The optical axis of the R-light as the S polarizing light is converted by the hologram-type optical characteristics switching element 7R1 for R-light, and the R-light is condensed at the top area on the flat plane side of the incident lens of the image forming optical system 15a. At the time t1, referring to FIG. 11A, of the hologram-type optical characteristics switching elements 7G1 to 7G3 for G-light, a voltage is applied to the hologram-type optical characteristics switching elements 7G1 and 7G3 for G-light. However, no voltage is applied to the hologram-type optical characteristics switching element 7G2 for G-light. The optical axis of the G-light as the S polarizing light is converted by the hologram-type optical characteristics switching element 7G2 for G-light, and the G-light is condensed at the center area on the flat plane side of the incident lens of the image forming optical system 15a. At the time t1, referring to FIG. 12A, of the hologram-type optical characteristics switching elements 7B1 to 7B3 for B-light, a voltage is applied to the hologram-type optical characteristics switching elements 7B1 and 7B2 for B-light. However, no voltage is applied to the hologram-type optical characteristics switching element 7B3 for B-light. The optical axis of the B-light as the S polarizing light is converted by the hologram-type optical characteristics switching element 7B3 for B-light, and the B-light is condensed at the bottom area on the flat plane side of the incident lens of the image forming optical system 15a. As mentioned above, in FIGS. 10A, 11A, and 12A, the R-light, the G-light, and the B-light are radiated at the top area, the center area, and the bottom area of the reflection-type liquid crystal panel 12a, respectively.

At the time t2, referring to FIG. 10B, a voltage is applied to the hologram-type optical characteristics switching elements 7R1 and 7R3 for R-light and no voltage is applied to the hologram-type optical characteristics switching element 7R2 for R-light. In this case, the optical axis of the R-light as the S polarizing light is converted by the hologram-type optical characteristics switching element 7R2 for R-light and the R-light is condensed at the center area of the flat plane of the incident lens of the image forming system 15a. At the time t2, referring to FIG. 11B, a voltage is applied to the hologram-type optical characteristics switching elements 7G1 and 7G2 for G-light and no voltage is applied to the hologram-type optical characteristics switching element 7G3 for G-light. In this case, the optical axis of the G-light as the S polarizing light is converted by the hologram-type optical characteristics switching element 7G3 for G-light and the G-light is condensed at the bottom area of the flat plane of the incident lens of the image forming system 15a. At the time t2, referring to FIG. 12B, a voltage is applied to the hologram-type optical characteristics switching elements 7B2 and 7B3 for B-light and no voltage is applied to the hologram-type optical characteristics switching element 7B1 for B-light. In this case, the optical axis of the B-light as the S polarizing light is converted by the hologram-type optical characteristics switching element 7B1 for B-light and the B-light is condensed at the top area of the flat plane of the incident lens of the image forming system 15a. At the time t3, referring to FIG. 10C, a voltage is applied to the hologram-type optical characteristics switching elements 7R1 and 7R2 for R-light and no voltage is applied to the hologram-type optical characteristics switching element 7R3 for R-light. In this case, the optical axis of the R-light as the S polarizing light is converted by the hologram-type optical characteristics switching element 7R3 for R-light and the R-light is condensed at the bottom area of the flat plane of the incident lens of the image forming system 15a. At the time t3, referring to FIG. 11C, a voltage is applied to the hologram-type optical characteristics switching elements 7G2 and 7G3 for G-light and no voltage is applied to the hologram-type optical characteristics switching element 7G1 for G-light. In this case, the optical axis of the G-light as the S polarizing light is converted by the hologram-type optical characteristics switching element 7G1 for G-light and the G-light is condensed at the top area of the flat plane of the incident lens of the image forming system 15a. At the time t3, referring to FIG. 12C, a voltage is applied to the hologram-type optical characteristics switching elements 7B1 and 7B3 for B-light and no voltage is applied to the hologram-type optical characteristics switching element 7B2 for B-light. In this case, the optical axis of the B-light as the S polarizing light is converted by the hologram-type optical characteristics switching element 7B2 for B-light and the B-light is condensed at the center area of the flat plane of the incident lens of the image forming system 15a.

As mentioned above, the R-light is sequentially radiated at the top area, the center area, and the bottom area of the liquid panel 15a. The G-light is sequentially is radiated at the center area, the bottom area, and the top area. The B-light is sequentially radiated at the bottom area, the top area, and the center area.

According to the tenth embodiment, the R-, G-, and B-light scrolls up and down on the liquid crystal panel 15a. However, the directions of the hologram-type optical characteristics switching elements 7R1 to 7R3, 7G1 to 7G3, and 7B1 to 7B3 and liquid crystal panel 15a may be rotated on the respective planes thereof so that the R-, G-, and B-light scrolls at the right and left on the liquid crystal panel 15a.

According to the tenth embodiment, the individual R-, G-, and B-light can scroll. Of course, instead of the R-, G-, and B-light, the R-, G-, B-, and W-light may scroll. Further, cyan, yellow, magenta, and white may scroll. Time for radiating the above color light can be freely determined depending on optical performance such as white balance of the video image, color concentration, and brightness. Obviously, the display using black and white, the display using two colors, and the like can be freely determined depending on product specification.

According to the tenth embodiment, the image forming optical system 15a needs increased costs. To solve the problem of the costs, a plurality of electrodes for voltage supply are provided for the hologram-type optical characteristics switching elements 7R1 to 7R3, 7G1 to 7G3, 7B1 to 7B3 for R-, G-, and B-light. If the optical axis of the R-light is changed by the optical characteristics switching element 7R1 for R-light so as not to apply a voltage to the optical characteristics switching element 7R1 and the R-light is radiated at the top area, a voltage is applied to an electrode provided at the top portion or the bottom portion of the optical characteristics switching element 7R1 or to electrodes provided both at the top portion and at the bottom portion of the optical characteristics switching element 7R1. In this case, the R-light radiated at the portion of the electrode is not condensed. The radiated R-light, G-light, and B-light are overlapped to the edges of the top area, the center area, and the bottom area on the reflection-type liquid crystal panel 12a, and a voltage is applied to an electrode provided at the top portion or the bottom portion of the optical characteristics switching element or to electrodes provided both at the top portion and at the bottom portion of the optical characteristics switching element 7R1 to 7R3, 7G1 to 7G3, and 7B1 to 7B3 so as not to polarize the optical axis of the voltage applied portion. In this case, the area at which the light is condensed changes. Referring to FIG. 7B, therefore, the areas at which the R-light, the G-light, and the B-light are condensed scroll up and down and the areas of the R-light, the G-light, and the B-light become continuous. In the case of FIG. 7B, the areas of the R-light, the G-light, and the B-light are enlarged, the area of the R-light is overlapped to the area of the G-light at the edge thereof, and the area of the G-light is overlapped to the B-light at the edge thereof. Thus, the overlapped portions may becomes complementary color light by slightly moving up and down the areas of the R-light, the G-light, and the B-light. Although the color switching method of the reflection-type liquid crystal panel 12a is used based on three-step switching according to the tenth embodiment, color switching having a plurality of steps, that is, three or more steps, may be used. In this case, the image smoothly scrolls the reflection-type liquid crystal panel 12a and, therefore, an image corresponding to color break-up can be hardly viewed. The optical characteristics switching element as optical characteristics switching element overlaps the light which is diffracted by the optical axes for diffraction at a plurality of steps. The optical characteristics switching element 7 as the optical characteristics switching element is provided for radiation of the R-light, the G-light, and the B-light, the R-light, the G-light, the B-light, and W-light, or-the cyan, yellow, and magenta.

Figure 13:
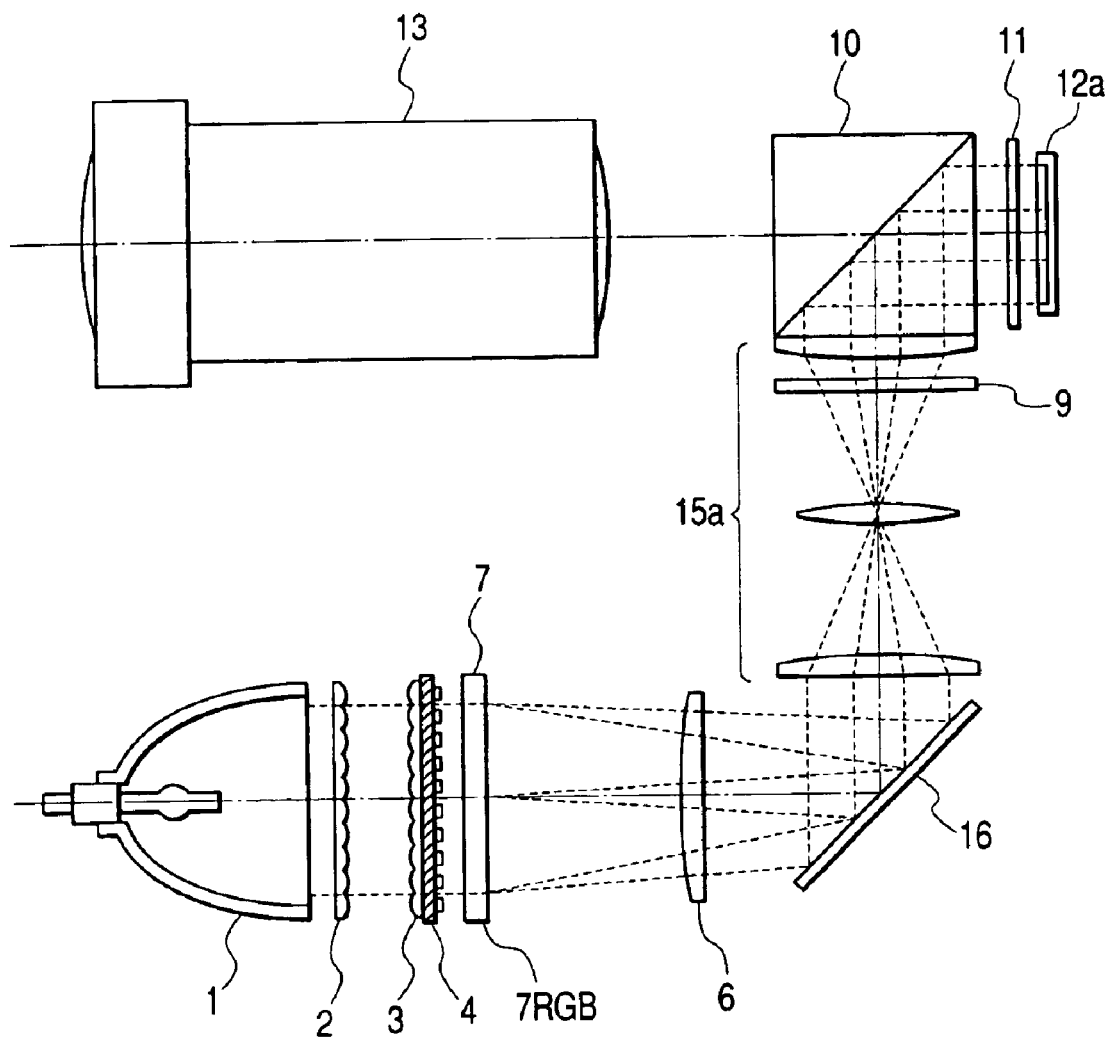
FIG. 13 is a schematic diagram showing the structure of an optical unit for a projection-type video display apparatus according to an eleventh embodiment of the present invention.

FIG. 13 is a schematic diagram showing the structure of an optical unit for a projection-type video display apparatus according to an eleventh embodiment of the present invention. Referring to FIG. 13, reference symbol 7RGB denotes an optical characteristics switching element which uses diffracting light in the hologram as described in FIGS. 10A to 12C. A condenser lens condenses the R-light, the G-light, and the G-light, as the S polarizing light, which are outputted by the optical characteristics switching element 7RGB. Then, those R-light, G-light, and B-light are reflected to the reflecting mirror 16, image-formed by the image forming optical system 15a, and reflected to the PBS 10. When a video signal indicates white, the reflected R-light, G-light, and B-light are transmitted through the PBS 10 as the P polarizing light and are incident on the projecting lens 13.

According to the eleventh embodiment, the reflection-type color characteristics switching element 7RGB may be used and be arranged, for example, at the position of the reflecting mirror 16. Thus, the overall size of the optical unit can be miniaturized and the U-shaped arrangement can minimize the size of the product set as shown in FIG. 13.

Figure 14:
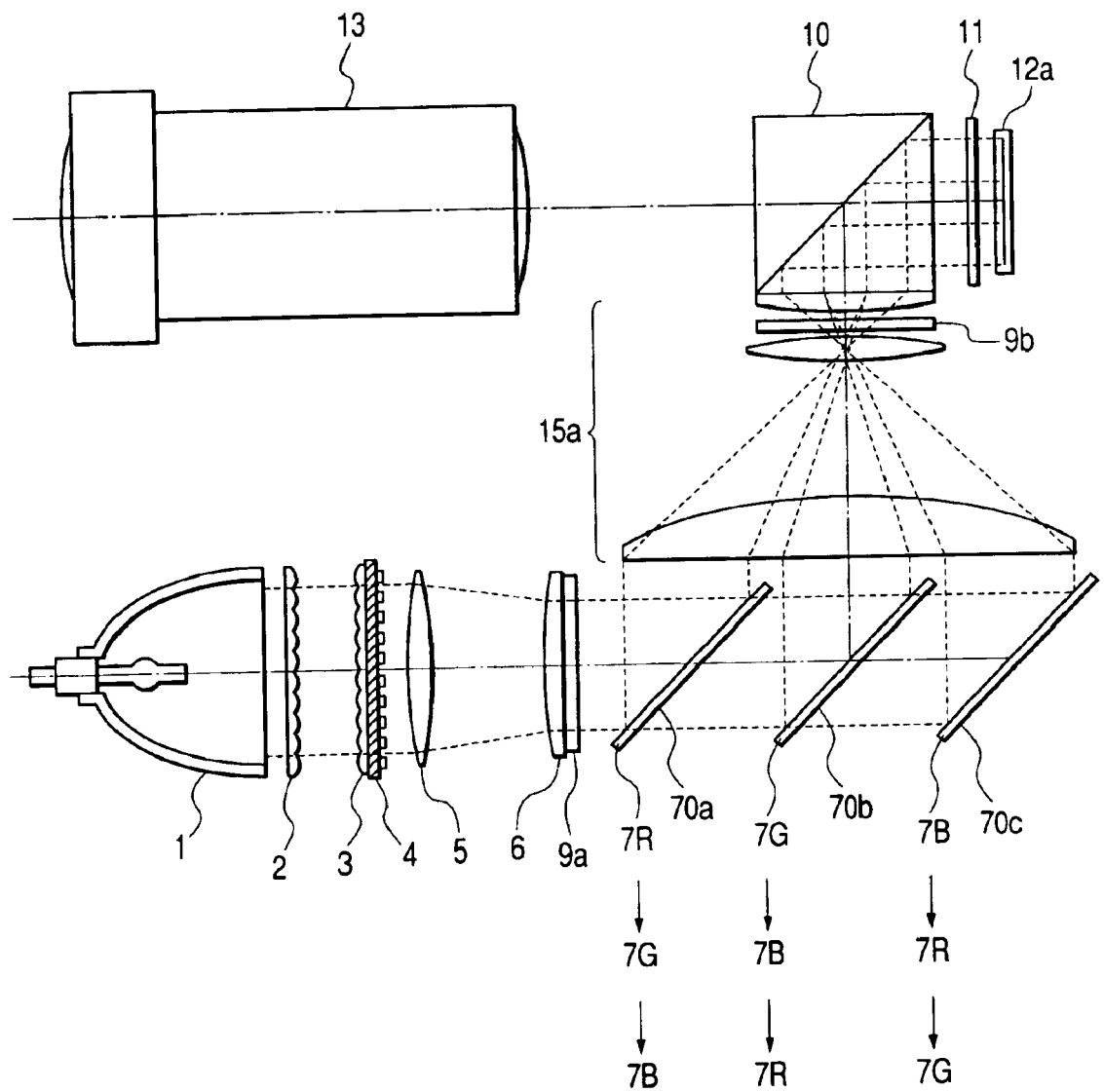
FIG. 14 is a schematic diagram showing the structure of an optical unit for a projection-type video display apparatus according to a twelfth embodiment of the present invention.

FIG. 14 is a schematic diagram showing the structure of an optical unit for a projection-type video display apparatus according to a twelfth embodiment of the present invention, in which the reflection-type optical characteristics switching elements 70a, 70b, and 70c for R-light, G-light, and B-light are used. Referring to FIG. 14, light from the reflection-type optical characteristics switching element 70a for R-light is incident on the left area of an incident lens in the image forming optical system 15a, light from the reflection-type optical characteristics switching elements 70b for G-light is incident on the center area of the incident lens in the image forming optical system 15a, and light from reflection-type optical characteristics switching element 70c for B-light is incident on the right area of the incident lens in the image forming optical system 15. At time 1, the R-light, which is converted into the S polarizing light, is incident on the image forming optical system 15a from reflection-type optical characteristics switching element 70a for R-light, the G-light, which is converted into the S polarizing light, is incident on the image forming optical system 15a from reflection-type optical characteristics switching element 70b for G-light, the B-light, which is converted into the S polarizing light, is incident on the image forming optical system 15a from the reflection-type optical characteristics switching element 70c for B-light. Consequently, the R-light is radiated at the top area, the G-light is radiated at the center area, and the B-light is radiated at the bottom area, of the reflection-type liquid crystal panel 12a, respectively. At the time t2, the G-light is outputted by the reflection-type optical characteristics switching element 70a for R-light, the B-light is outputted by the reflection-type optical characteristics switching element 70b for G-light, the R-light is outputted by the reflection-type optical characteristics switching element 70c for B-light. Consequently, the G-light, B-light, and R-light are radiated at the top area, the center area, and the bottom area, of the reflection-type liquid crystal panel 12a, respectively. Similarly, at the time t3, the B-light is outputted by the reflection-type optical characteristics switching element 70a for R-light, the R-light is outputted by the reflection-type optical characteristics switching element 70b for G-light, the G-light is outputted by the reflection-type optical characteristics switching element 70c for B-light. Consequently, the B-light, R-light, and G-light are radiated at the top area, the center area, and the bottom area, of the reflection-type liquid crystal panel 12a, respectively. As mentioned above, the different color light is radiated to the top area, the center, and the bottom area, of the reflection-type liquid crystal panel 12a.

Of course, instead of the group 70a, 70b, and 70c of reflection-type optical characteristics switching elements for R-, G-, and B-light, a reflecting mirror may be used. According to the twelfth embodiment, the reflection-type liquid crystal panel 12a is separated into the three areas and the color light sequentially scrolls on the three areas. However, the reflection-type liquid crystal panel 12a can be separated into two areas, or three or more areas. In this case, sequentially, the color switching can be performed. The color switching not only of R, G, and B but also of R, G, B, W, and the like can be performed.

Figure 15:
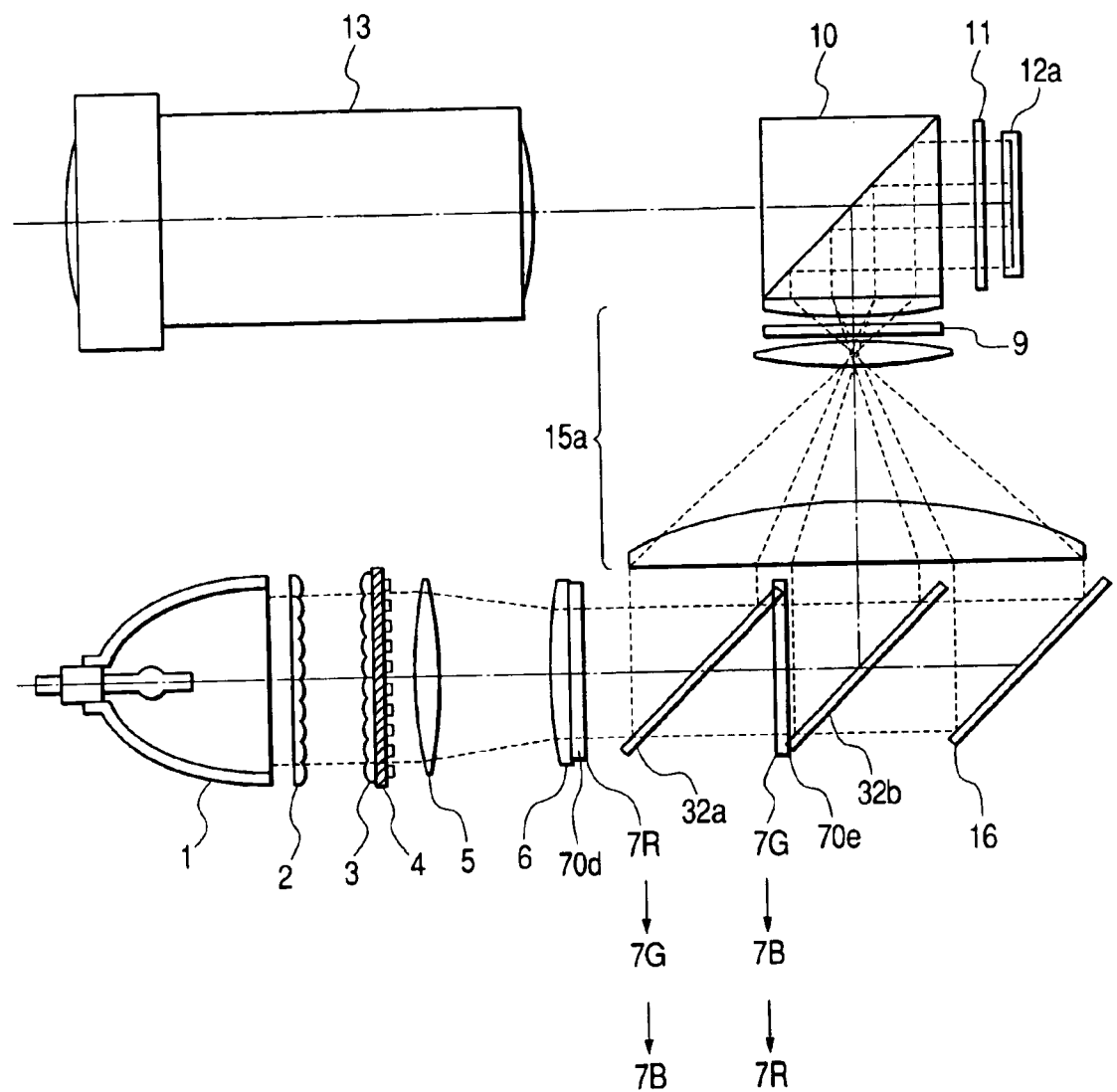
FIG. 15 is a schematic diagram showing the structure of an optical unit for a projection-type video display apparatus according to a thirteen embodiment of the present invention.

FIG. 15 is a schematic diagram showing the structure of an optical unit for a projection-type video display apparatus according to a thirteenth embodiment of the present invention, in which groups 70d and 70e of transmission-type optical characteristics switching elements, PBSs 32a and 32b, and the reflecting mirror 16 are used.

Referring to FIG. 15, at time t1, an R polarizing rotation control element of the transmission-type optical characteristics switching element 70d makes the R-light as the S polarizing light incident on the PBS 32a, the incident light is reflected to the PBS 32a, and it is incident on the left area of the image forming optical system 15a. The G-light and B-light are converted into the P polarizing light by the transmission-type optical characteristics switching element 70d, are transmitted through the PBS 32a, and are incident on the transmission-type optical characteristics switching element 70e. Of the G-light and the B-light, the G-light is converted into the S polarizing light by the transmission-type optical characteristics switching element 70e, and the B-light as the P polarizing light is incident on the PBS 32b. The G-light is reflected to the PBS 32b, and is incident on the center area of the image forming optical system 15a. The B-light as the P polarizing light is reflected to the reflecting mirror 16, is converted into the S polarizing light by the $\lambda/2$ phase difference plate 33, and is incident on the right area of the image forming optical system 15a.

At time t2, the G-light is converted into the S polarizing light by the transmission-type optical characteristics switching element 70d, is reflected to the PBS 32a, and is incident on the left area of the image forming optical system 15a. The B-light is reflected to the PBS 32b, and is incident on the center area of the image forming optical system 15a. The R-light as the P polarizing light is reflected to the reflecting mirror 16, is converted into the S polarizing light by the $\lambda/2$ phase difference plate 33, and is incident on the image forming optical system 15a. As mentioned above, the R-light, the G-light, and the B-light are sequentially incident on the left area of the image forming optical system 15a. The G-light, the B-light, and the R-light are sequentially incident on the center area of the image forming optical system 15a. The B-light, the R-light, and the G-light are sequentially incident on the right area of the image forming optical system 15a. The different color light is sequentially radiated at the top area, the center area, and the bottom area of the transmission-type liquid crystal panel 12a. Although the transmission-type liquid crystal panel 12a is separated into the three areas and the different color light scroll on the three areas, the transmission-type liquid crystal panel 12a can be separated into two areas or three or more areas. In this case, sequentially the color switching is smoothly performed. Not only the color switching of R, G, and B but also the color switching of the R, G, B, and W performed depending on the characteristics of the group 70d and 70e of transmission-type optical characteristics switching elements.

Hereinbelow, a scroll method according to the present invention will be described.

Figure 27:
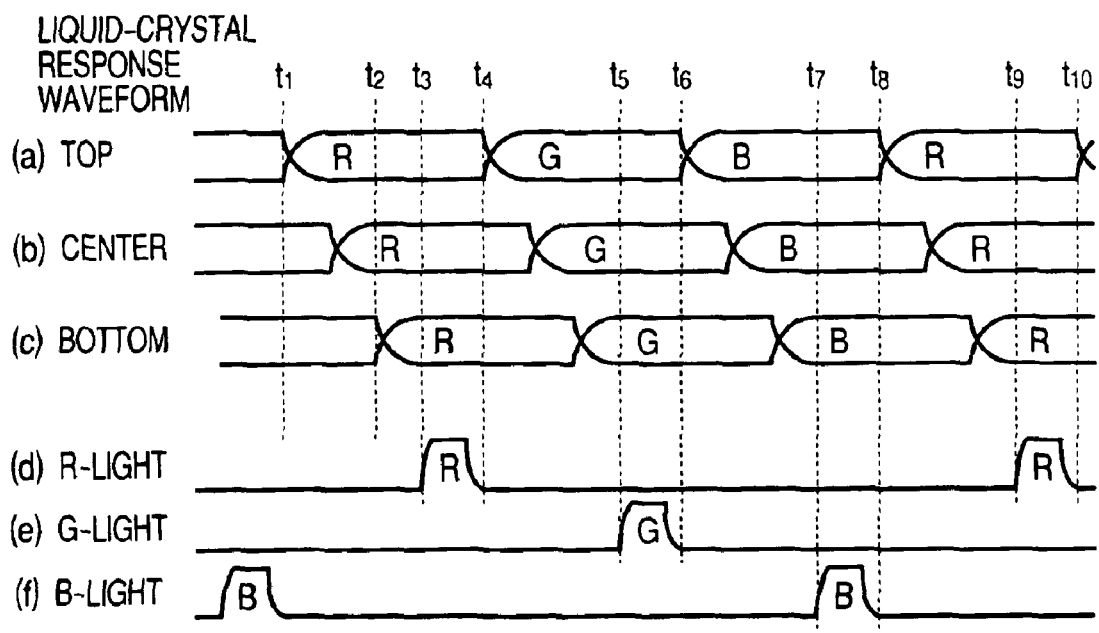
FIG. 27 is a characteristics diagram showing light waveforms and response waveforms of a liquid crystal panel.

Referring to FIG. 27, by using the R polarizing rotation control element 211, the G polarizing rotation control element 212, and the B polarizing rotation control element 213 described in FIGS. 25A to 25F, at one time, the R-light is radiated to the overall liquid crystal panel 232, at another time, the G-light is radiated to the overall liquid crystal panel 232, and at further another time, the B-light is radiated to the overall liquid crystal panel 232. These operations are repeated, thereby projecting the color video image onto the projection screen.

Hereinbelow, a description is given of a relationship among response waveforms of the liquid crystal panel 232 and light waveforms radiated on the liquid crystal panel 232.

FIG. 27 is a characteristics diagram showing the waveforms of light and the response waveforms of the liquid crystal panel. Referring to FIG. 27, a waveform (a) shows a status in which a video signal is written to an electrode at the top of the liquid crystal panel 232, a waveform (b) shows a status in which a video signal is written to an electrode in the center of the liquid crystal panel 232, a waveform (c) shows a status in which a video signal is written to an electrode at the bottom of the liquid crystal panel 232, a waveform (d) shows a waveform of the R-light radiated to the liquid crystal panel 232, a waveform (e) shows a waveform of the G-light radiated to the liquid crystal panel 232, and a waveform (f) shows a waveform of the B-light radiated to the liquid crystal panel 232.

An operation for writing the video signal to the overall liquid crystal panel 232 needs time t1 to t2. Time t2 to t3 corresponds to the response time of liquid crystal. After the time t2 to t3, the R-light is radiated. Next, the R-light must fall before time t4 for writing the video signal to the electrode at the top of the liquid crystal panel 232. If the R-light is radiated over the time t4, the mixing of color light is caused because of the generation of a video image the G-light starts. Therefore, the R-light must fall before the time t4. As described above, the G-light is radiated to the liquid crystal panel 232 at time t5 to t6, and the B-light is radiated to the liquid crystal panel 232 at time t7 to t8. In the case of sequentially radiating the R-light, G-light, a B-light to the liquid crystal panel 232, the use efficiency of the light deteriorates.

An improved scroll method will be described with reference to FIGS. 16 and 17. The scroll method is realized by using, for example, the R polarizing rotation control element 211, the G polarizing rotation control element 212, and the B polarizing rotation control element 213, which are shown in FIG. 26. A large number of electrodes extending in the horizontal direction are provided for the R polarizing rotation control element 211, the G polarizing rotation control element 212, and the B polarizing rotation control element 213 in the vertical direction, respectively. These electrodes are turned on/off, thereby changing areas of the R-light, the G-light, and the B-light which are radiated to the liquid crystal panel.

Figure 16:
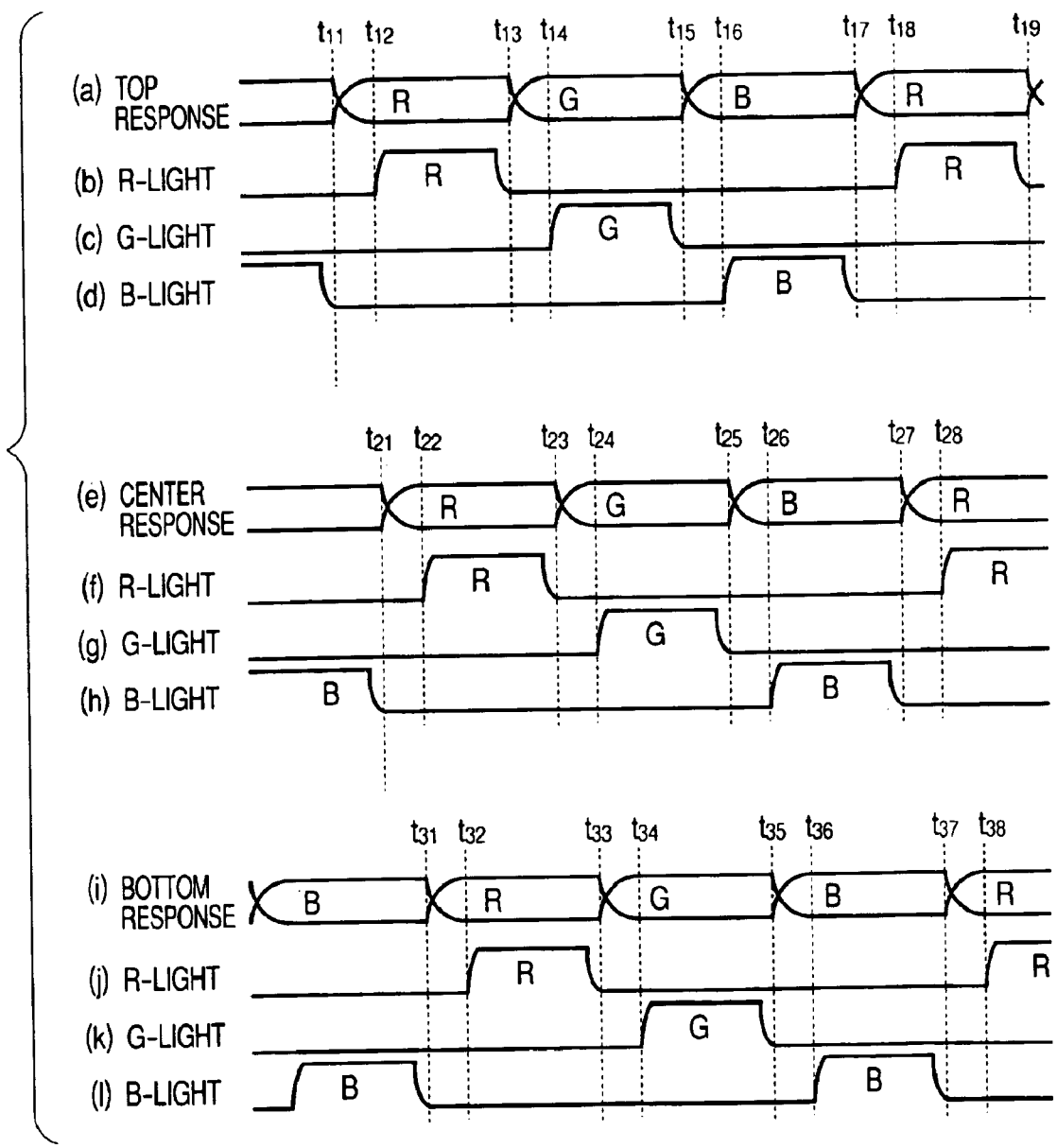
FIG. 16 is a characteristics diagram showing waveforms of light and response waveforms of a liquid crystal panel, for explaining a scroll method according to the first embodiment of the present invention.

FIG. 16 is a characteristics diagram showing light waveforms and response waveforms of the liquid crystal panel for explaining a scroll method according to the first embodiment of the present invention. Referring to FIG. 16, waveforms (a), (e), and (i) show response waveforms of the liquid crystal panel, waveforms (b), (f), and (j) show waveforms of the R-light which is radiated to the liquid crystal panel, waveforms (c), (g), and (k) show waveforms of the G-light which is radiated to the liquid crystal panel, and waveforms (d), (h), and (l) show waveforms of the B-light which is radiated to the liquid crystal panel.

FIGS. 17A to 17H are front views of a liquid crystal panel for explaining a scroll method according to the second embodiment of the present invention, in which writing of signals, responses of liquid crystal, and R-light, G-light, and B-light on the liquid crystal panel when the R-, G-, and B-light scroll on the liquid crystal panel in accordance with the characteristics diagram in FIG. 16.

Referring to FIG. 16, as shown in the waveform (a), at time t11, an R video signal starts to be written to an electrode L1 (not shown) at the top of liquid crystal panel. After the response time of the liquid crystal, as shown in the waveform (b), at time t12, the R-light is radiated to the electrode L1 and the R video signal is written to the electrode at the bottom of the liquid crystal panel. After that, at time 13, a G video signal is written to the electrode L1. As shown in the waveform (c), at time t14, the G-light is radiated. At time t15, a B video signal is written to the electrode L1. As shown in the waveform (d), at time t16, the B-light is radiated to the electrode L1. As shown in the waveform (b), the R-light is supplied to the electrode L11 so as to fall just before the time t12 to t13.

The R video signal is sequentially written to electrodes in the down-direction, starting from the electrode L1 of the liquid crystal. As shown in the waveform (e), at time t21, the R video signal is written to an electrode Lm (not shown) in the center of the liquid crystal panel. After the response time of the liquid crystal, as shown in the waveform (f), at time t22, the R-light is radiated to the electrode Lm of the liquid crystal. Thereafter, the R video signal is sequentially written to the electrodes. As shown in the waveform (g), at time t24, the G-light is radiated to a liquid crystal portion corresponding to the electrode Lm. As shown in the waveform (h), at time t26, the B-light is radiated to a liquid crystal portion corresponding to the electrode Lm.

At time t31, as shown in the waveform (i), the R video signal is written to an electrode Lz (not shown) at the bottom of the liquid crystal panel. After the response time of the liquid crystal, as shown in the waveform (j), at time t32, the R-light is radiated to a liquid crystal portion corresponding to the electrode Lz. The R-light is supplied to the electrode Lz so as to fall just before time t33 for applying a voltage to the electrode Lz. As shown in the waveform (k), the G-light is radiated to the liquid crystal panel at time t34 to t35. As shown in the waveform (l), the B-light is radiated to the liquid crystal panel at time t36 to t37.

Figure 17A:
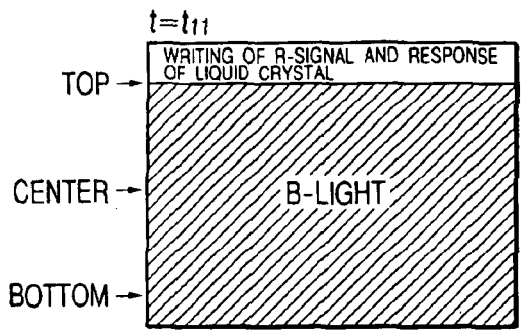
FIGS. 17A to 17H are front views of a liquid crystal panel for explaining a scroll method according to the second embodiment of the present invention.

A description is given of a case in which the R-light, the G-light, and the B-light are supplied to the liquid crystal panel by using the liquid crystal panel. Referring to FIG. 17A, the B-light is radiated to the liquid crystal panel, it is completely radiated to the electrode L1, thereafter, at time t11, the R video signal starts to be supplied to the electrode L1. Then, the R video signal is sequentially supplied to the electrode, after the response time of the liquid crystal, the R-light is radiated to a liquid crystal portion corresponding to the electrode.

Figure 17B:
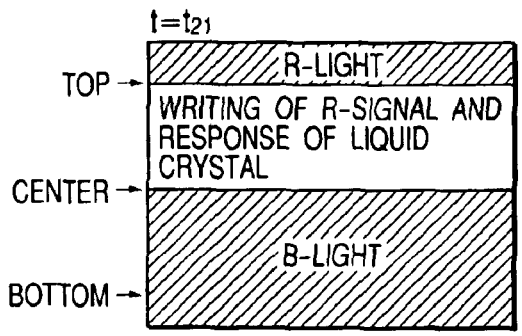

At time t12 to t21, the R video signal is sequentially supplied to the electrodes of the liquid crystal panel, and the R-light is radiated after the response time of the liquid crystal. As shown in FIG. 17B, the R-light is radiated. The time t21 to t22 corresponds to the response time of the liquid crystal for the R video signal which is supplied to the electrode Lm. The B-light is radiated only to a down portion of the electrode Lm.

Figure 17C:
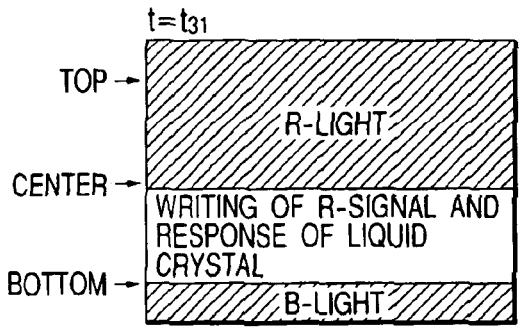

As shown in FIG. 17C, at time t31, the R video signal is written to the electrode Lz. Time t31 to t32 corresponds to the response time of the liquid crystal. Just before the time t32, the R-light is radiated to a liquid crystal panel portion corresponding to the electrodes in the upper area of the electrode Lz.

Figure 17D:
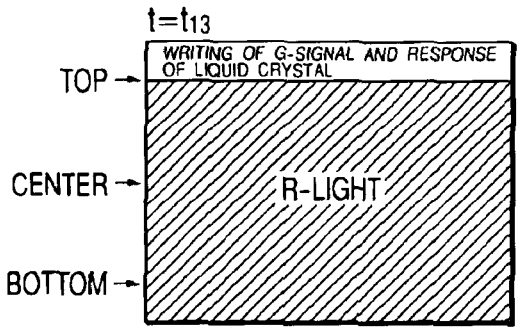

As shown in FIG. 17D, after t13, the G video signal is written to the electrode L1. The R-light is radiated to the electrodes other than the electrode L1. Time t13 to t14 corresponds to the response time of the liquid crystal of the G video signal which is supplied to the electrode L1. Until time t23, the G video signal is sequentially supplied to the electrodes starting from the electrode L1. After the response time of the liquid crystal, the G-light is radiated to a liquid-crystal portion corresponding to the electrode.

Figure 17E:
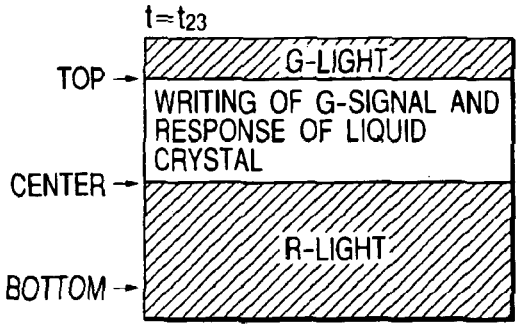

As shown in FIG. 17E, at time t23, the G video signal is supplied to the electrode L1. After the response time of the liquid crystal, the G-light is radiated to a liquid crystal portion corresponding to the electrode L1. The R-light is radiated to a liquid crystal portion corresponding to the electrode at the down area of the electrode Lm.

Figure 17F:
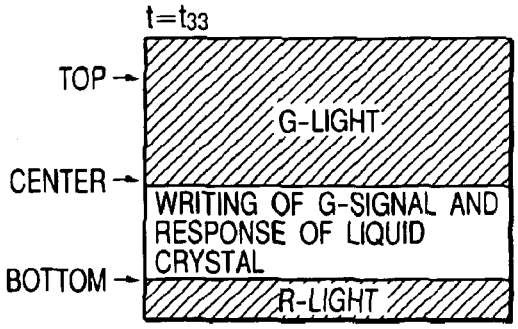

As shown in FIG. 17F, at time t33, the G video signal is supplied to the electrode Lz. Time t33 to t34 corresponds to the response time of the liquid crystal. At this timing, the R-light is not radiated to s liquid crystal portion corresponding to the down electrodes of an electrode L2.

Figure 17G:
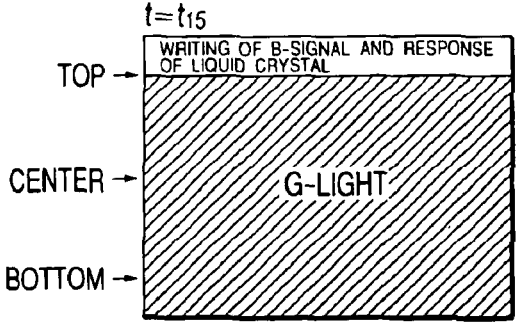

As shown in FIG. 17G, at time t15, the B video signal is supplied to the electrode L1. Time t15 to t16 corresponds to the response time of the liquid crystal. In this case, the G-light is radiated to a liquid crystal portion corresponding to the electrodes at the down area of the electrode L1.

Figure 17H:
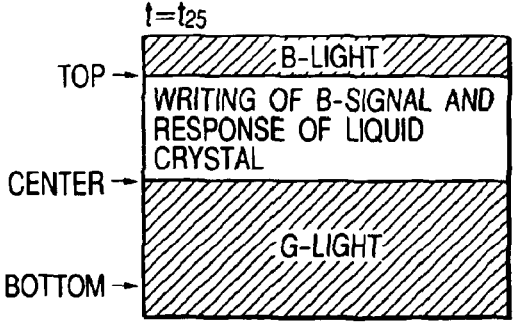

As shown in FIG. 17H, at time t25, the B video signal is supplied to the electrode Lm. Time t25 to t26 corresponds to the response time of the liquid crystal. The G-light is radiated to a liquid crystal portion corresponding to the electrodes at the down area of the electrode Lm. The B-light is radiated to a liquid crystal portion corresponding to the electrodes at the up area in which the B video signal is written and the liquid crystal has already responded.

According to the first embodiment, the best radiation conditions can be set to the above portions without waiting for the response of the overall liquid crystal. Thus, the light can be efficiently used because a radiating time can be long, as compared with the case in FIG. 27.

Figure 18:
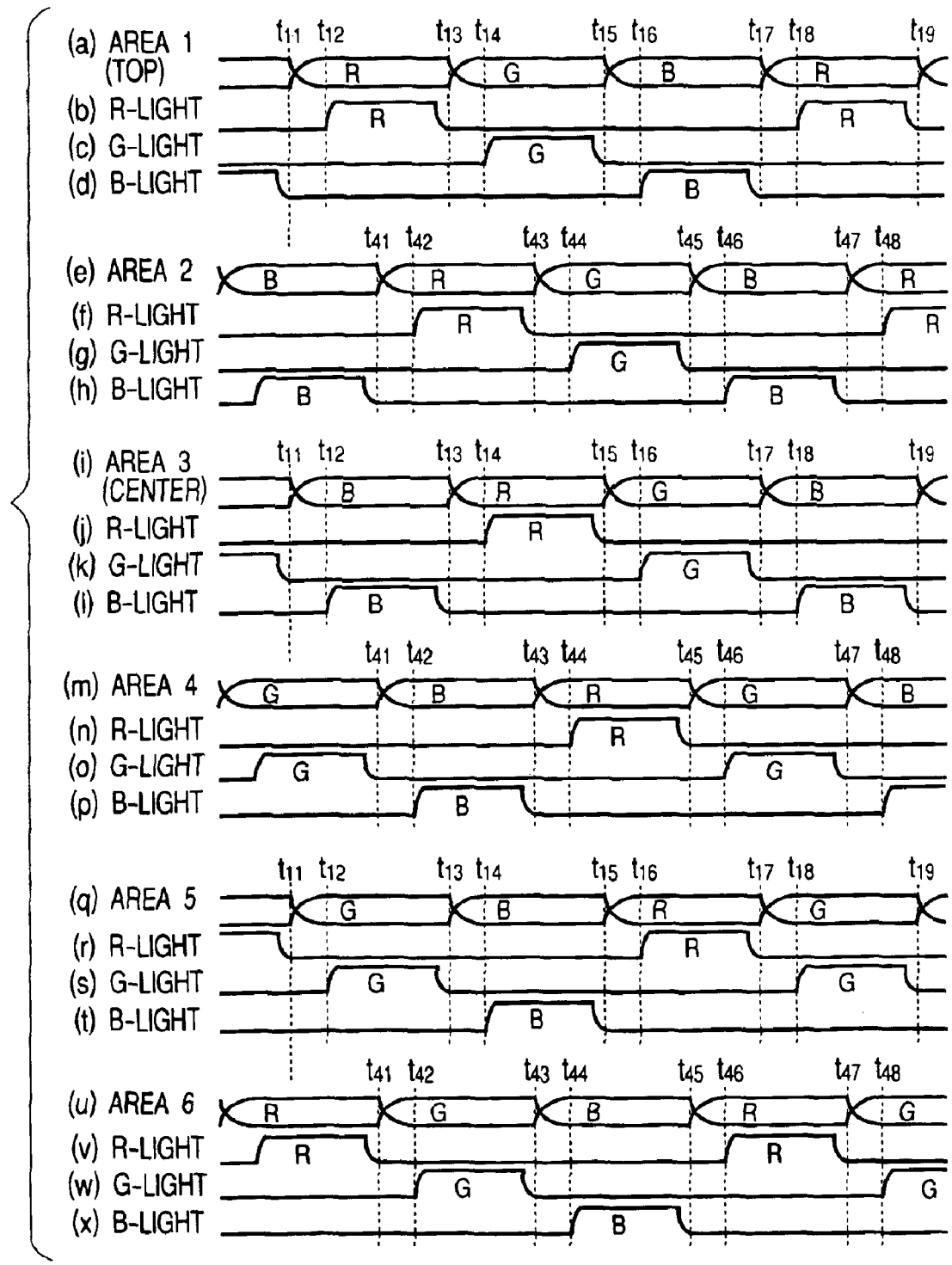
FIG. 18 is a characteristics diagram showing light waveforms and response waveforms of a liquid crystal panel, for explaining a scroll method according to the second embodiment of the present invention.

FIG. 18 is a characteristics diagram showing light waveform and response waveforms of the liquid crystal panel for explaining a scroll method according to the second embodiment of the present invention.

FIGS. 19A to 19D are front views of the liquid crystal panel for explaining the scroll method according to the second embodiment of the present invention.

Figure 19A:
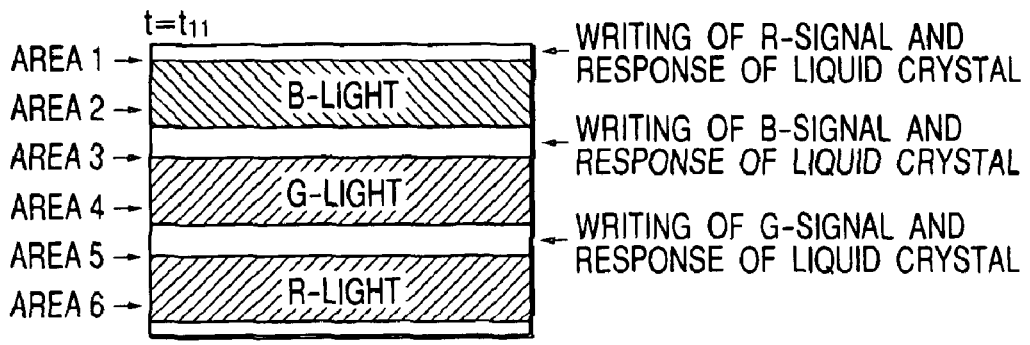
FIGS. 19A to 19D are front views of a liquid crystal panel for explaining the scroll method according to the second embodiment of the present invention.
Figure 19B:
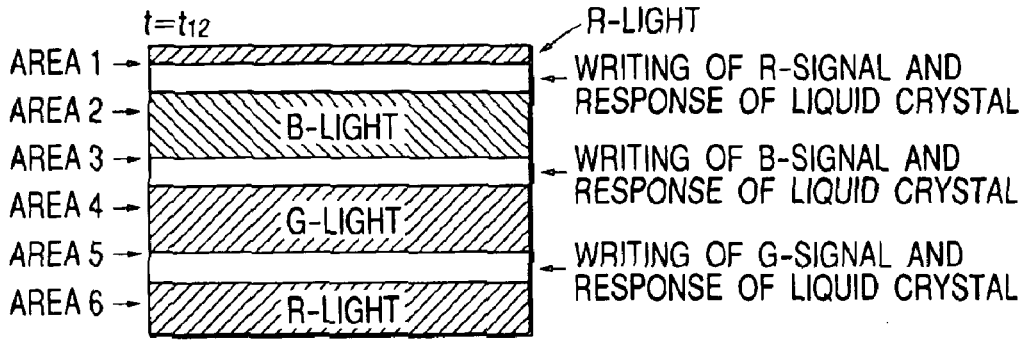
Figure 19C:
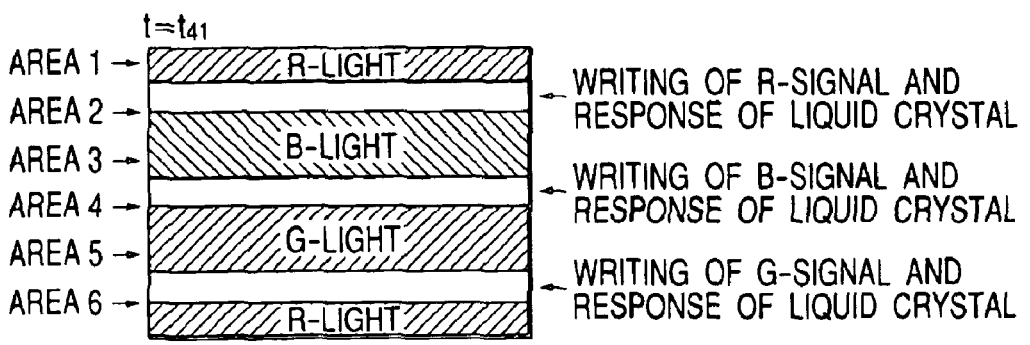
Figure 19D:
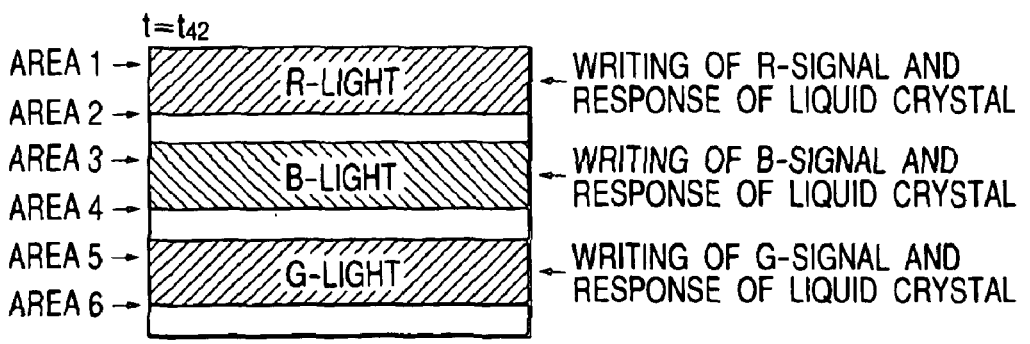

FIG. 18 shows a relationship among timings of the R-light, the G-light, and the B-light, and response waveforms of the liquid crystal at typical six areas in the liquid crystal panel shown in FIGS. 19A to 19D. Referring to FIGS. 18 to 19D, there are six statuses of the liquid crystal panel, of writing of an R-signal, a G-signal, and a B-signal and radiation of the R-light, the B-light, and the G-light. In FIGS. 19A to 19D, the R-light, the G-light, and the B-light are simultaneously radiated at different areas of the liquid crystal panel. The R-light, the G-light, and the B-light are sequentially moved in a descending direction. The R video signal, the G video signal, and the B video signal are written to the liquid crystal panel, and the R-light, the G-light, and the B-light are sequentially to the electrodes in which the response time of the liquid crystal passes.

First, a description is given of time t11 to t12.

As shown in waveforms (a) to (d) of FIG. 18 and in FIG. 19A, at an area 1, at time t11, the R video signal is supplied and, thereafter, time t11 to t12 corresponds to the response time of the liquid crystal at which no light is radiated at the area 1.

As shown in waveforms (e) to (h) of FIG. 18 and in FIG. 19A, at an area 2, the B light is radiated.

As shown in waveforms (i) to (l) of FIG. 18 and in FIG. 19A, at an area 3, at time t11, the B video signal is supplied and, thereafter, the time t11 to t12 corresponds to the response time of the liquid crystal at which no light is radiated at the area 3.

As shown in waveforms (m) to (p) of FIG. 18 and in FIG. 19A, the G-light is radiated.

As shown in waveforms (q) to (t) of FIG. 18 and in FIG. 19A, at an area 5, the G video signal is supplied at a part thereof at the time t11. Thereafter, the time t11 to t12 corresponds to the response time of the liquid crystal at which no light is radiated at the area 5.

As shown in waveforms (u) to (x) of FIG. 18 and in FIG. 19A, at an area 6, the R light is radiated.

Further, a description is given of time t12 to t41 with reference to FIGS. 18 and 19B.

At the time t11, the R video signal written from the top electrode of the liquid crystal panel is sequentially written to the down electrodes. Simultaneously, the B video signal and G video signal, which are written at the time t11, are sequentially written to the down electrodes.

At the area 1, the R video signal, which is written at the time t11, is radiated after the time t12 at which the response time of the liquid crystal passes.

Although the B-light is sequentially moved down, the B-light is still radiated at the area 2.

At the area 3, the B video signal is written at the time t11, is radiated after the time t12 at which the response time of the liquid crystal passes. Although the G-light is sequentially moved down, the G-light is still radiated at the area 4.

At the area 5, the G video signal, which is written at the time t11, is radiated after the time t12 at which the response time of the liquid crystal passes. Although the R-light is sequentially moved down, the R-light is still radiated at the area 6.

Hereinbelow, a description is given of time t41 and time subsequent to time t42 with reference to FIG. 18 and FIGS. 19C and 19D. At the up area of the liquid crystal panel, an area to which the R light is radiated is increased. Positions at which the B-light, the G-light, and the R-light are radiated are sequentially moved down. Also, positions at which R-light, the B-light, and the G-light are written are sequentially moved down.

According to the second embodiment, three optical characteristics switching elements, composed of the R polarizing rotation control element, the G polarizing rotation control element, and the B polarizing rotation control element, are provided. The respective R polarizing rotation control element, the G polarizing rotation control element, and the B polarizing rotation control element has a plurality of electrodes which are controlled thereby. Since only one or two color-light can be simultaneously used on the liquid crystal panel in FIGS. 17A to 17H, the remaining one or two color-lights are not used and become unnecessary. However, according to the second embodiment, the use efficiency of light is improved because the R-light, the G-light, and the B-light can be simultaneously radiated. As mentioned above, according to the second embodiment, the use efficiency of light is further improved.

In the above description of the scroll method, no light is radiated to the liquid crystal so as to prevent the mixing of color light at the response time of the liquid crystal. However, hereinbelow, a description is given of a method for radiating the light even in the response time of the liquid crystal while the mixing of color light is unremarkable, with reference to FIG. 20 and FIGS. 21A and 21B.

Figure 20:
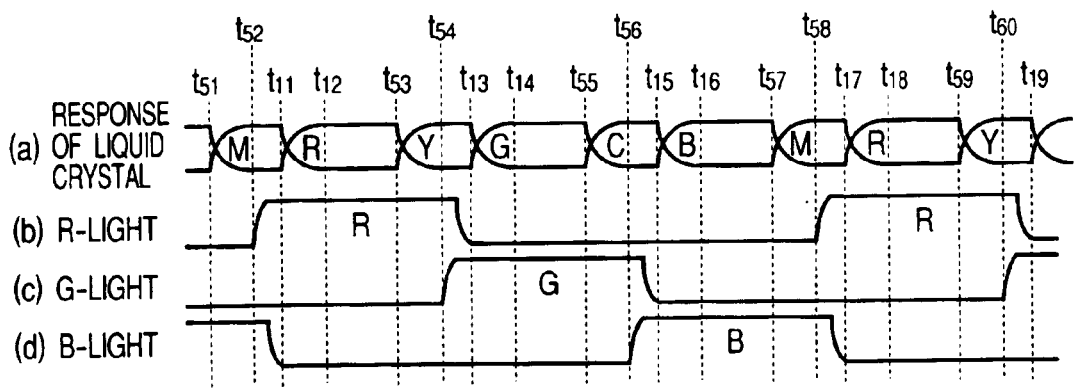
FIG. 20 is a characteristics diagram showing light waveforms and response waveforms of a liquid crystal panel, for explaining a scroll method according to the third embodiment of the present invention.

FIG. 20 is a characteristics diagram showing light waveforms and response waveforms of the liquid crystal panel for explaining a scroll method according to the third embodiment of the present invention.

Figure 21A:
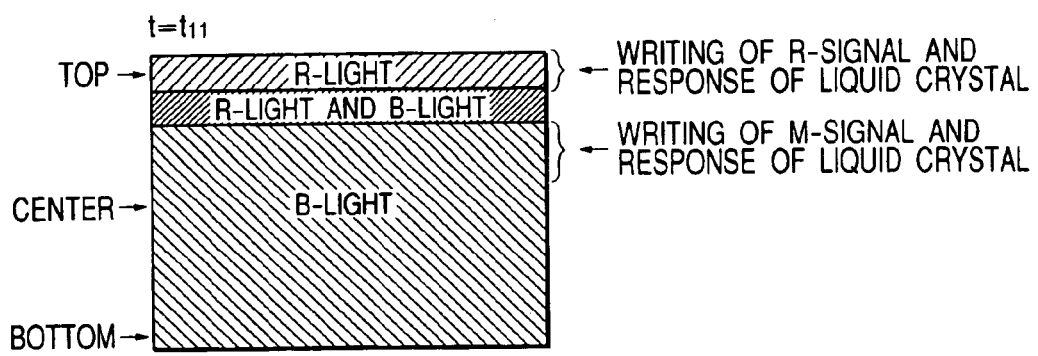
FIGS. 21A and 21B are front views of the liquid crystal panel for explaining the scroll method according to the third embodiment of the present invention.
Figure 21B:
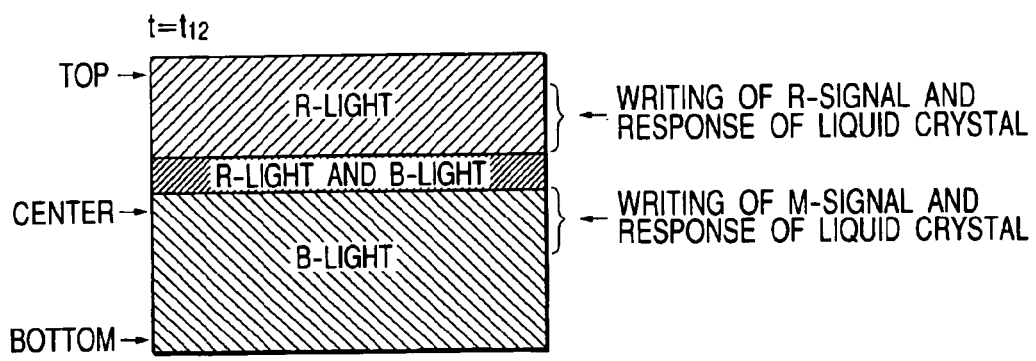

FIGS. 21A and 21B are front views of the liquid crystal panel for explaining the scroll method according to the third embodiment of the present invention.

Referring to FIG. 20, the operating waveforms corresponding to those at the top in FIG. 16 are shown.

As shown in waveforms (a) to (d) in FIG. 20, video signals are sequentially written to the liquid crystal panel in order of magenta (M), red (R), yellow (Y), green (G), cyan (C), and black (B). The R-light is radiated at time t52 to t13. In other words, the R-light is radiated at an interval of M at which the response time of the liquid crystal passes, at an interval of R including the response time t11 to t12 of the liquid crystal, and at an interval of Y including the response time t53 to t54 of the liquid crystal. The G-light is radiated at time t54 to t15. In other words, the R-light is radiated at an interval of Y at which the response time of the liquid crystal passes, at an interval of G including the response time t13 to t14 of the liquid crystal, and at an interval of C including the response time t55 to t56 of the liquid crystal. The B-light is radiated at time t56 to t17. In other words, the B-light is radiated at an interval of C at which the response time of the liquid crystal passes, at an interval of B including the response time t15 to t16 of the liquid crystal, and at an interval of M including the response time t57 to t58 of the liquid crystal. At the time t11, the operation for writing the R video signal to the electrode at the top of the liquid crystal panel is started and the R video signal is sequentially written to the down electrodes thereof.

The above description continues with reference to FIG. 21A showing the status of the light on the liquid crystal panel at the time t11 and FIG. 21B showing the status of the light on the liquid crystal panel at the time t12. At the time t11, the R-light is radiated at the top area of the liquid crystal, and the area thereof is sequentially increased. At the next area of the R-right area, the R-light or the B-light is radiated and the area thereof is sequentially moved down. In accordance the movement, the B-light area is sequentially decreased.

A video signal of M (hereinafter, abbreviated to an M video signal) is written. After the response time of the liquid crystal passes, the R-light and the B-light are radiated. A video signal of Y (hereinafter, abbreviated to a Y video signal) is written. After the response time of the liquid crystal passes, the R-light and the G-light are radiated. A video signal of C (hereinafter, abbreviated to a C video signal) is written. After the response time of the liquid crystal passes, the G-light and the B-light are radiated.

According to the third embodiment, as mentioned above, the Y video signal, the C video signal, and the M video signal are written among the R video signal, the G video signal, and the B video signal. Thus, the time for radiating the R-light, the G-light, and the B-light can be prolonged and the deterioration in color due to the mixing of color light can be improved by setting the intervals of the R-light, the G-light, and the B-light as complementary color light.

Figure 22:
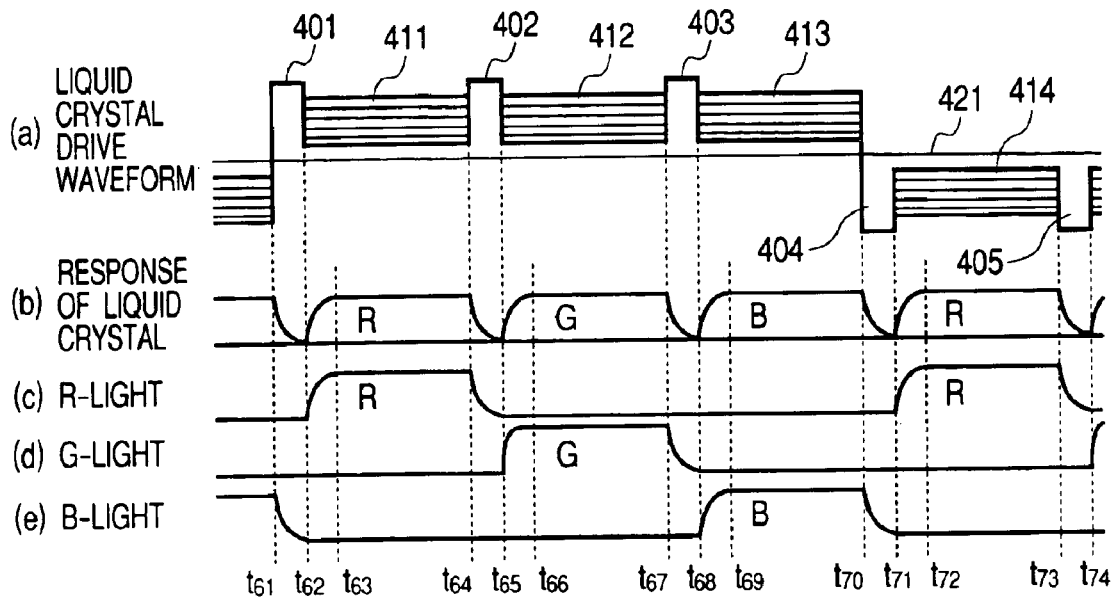
FIG. 22 is a waveform diagram for explaining a method for reducing a response time of liquid crystal.

Hereinbelow, a description is given of a method for reducing the response time of the liquid crystal with reference to FIG. 22. FIG. 22 is a waveform diagram for explaining the method for reducing the response time of the liquid crystal in which a waveform (a) shows a liquid crystal drive waveform, a waveform (b) shows response characteristics of the liquid crystal, a waveform (c) shows a waveform of the R-light, a waveform (d) shows a wave form of the G-light, and a waveform (e) shows a waveform of the B-light.

With respect to the response characteristics of the liquid crystal, it is slow upon transition from a middle tone to the other middle tone, and it is relatively fast upon transition from white to black or from black to white. Therefore, before starting to write the video signal to the liquid crystal, pulses 401 to 403 are applied and a voltage corresponding to black in the video signal or a positive signal voltage equal to the voltage or higher is written, thus resetting the liquid crystal panel. Also, pulses 404 and 405 are applied and a voltage corresponding to black in the video signal or a negative signal voltage equal to the voltage or higher is written, thus resetting the liquid crystal panel. Accordingly, the response time of the liquid crystal is reduced and the effect of the mixing of color light is further reduced.

Hereinbelow, a description is given of a switching method of various lights in the scroll method.

Figure 23:
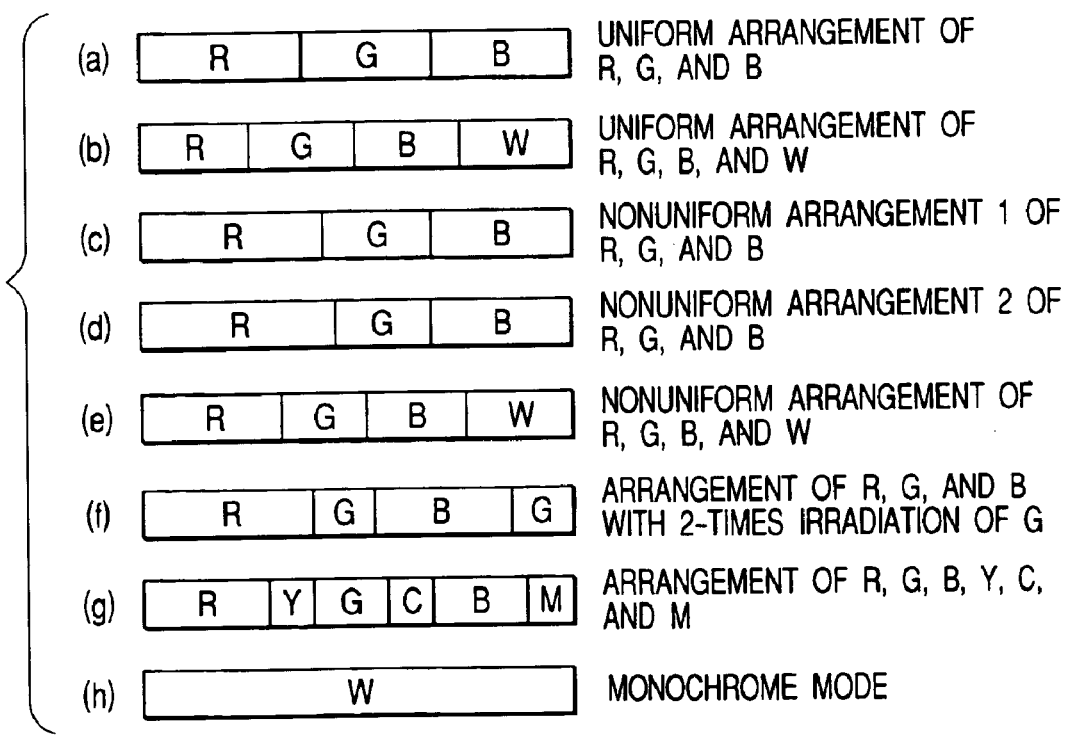
FIG. 23 is a schematic diagram for explaining a light switching method according to the scroll method.

FIG. 23 is a schematic diagram for explaining a switching method of light in the scroll method. In an arrangement (a) of FIG. 23, the R-light, the G-light, and the B-light are sequentially switched and are radiated on the liquid crystal panel. In an arrangement (b) of FIG. 23, the R-light, the G-light, the B-light, and the W-light are sequentially switched and are radiated on the liquid crystal panel, and a brighter video image is thus obtained, as compared with that in the arrangement (a). In an arrangement (c) of FIG. 23, the R-light, G-light, and B-light are sequentially switched and are radiated on the liquid crystal panel by sequentially prolonging the radiating times thereof in order of the G-light, the B-light, and the R-light, for example, in inverse proportion to characteristics of dispersion distribution of the lamp and, thus a video image having preferable white balance can be obtained. In an arrangement (d) of FIG. 23, the R-light is radiated for longer time and the radiating time of the G-light is prolonged corresponding to the long radiation of the R-light, as compared with the arrangement (c), and the R-light and the B-light which are weaker than the G-light can be compensated for and color temperatures thereof can be switched. In an arrangement (e) of FIG. 23, the radiating time of the R-light is longer than those of the G-light and the B-light, as compared with the arrangement (b). In an arrangement (f) of FIG. 23, the G-light having a higher relative luminosity is radiated twice, as compared with the arrangement (a), thus having the advantage to prevent color separation of after-video-images of the R-, G-, and B-light. In an arrangement (g) of FIG. 23, Y (yellow) light, C (cyan) light, and M (magenta) light as complementary color light are inserted in the R-light, the G-light, and the B-light, thus ensuring the brightness, as compared with the arrangement (a). In an arrangement (h) of FIG. 23, there is only the W-light (white light) and a monochrome image brighter than the color image can be obtained.

Hereinbelow, a description is given of a drive circuit block for switching the arrangements (a) to (h) of FIG. 23 with reference to FIG. 24.

Figure 24:
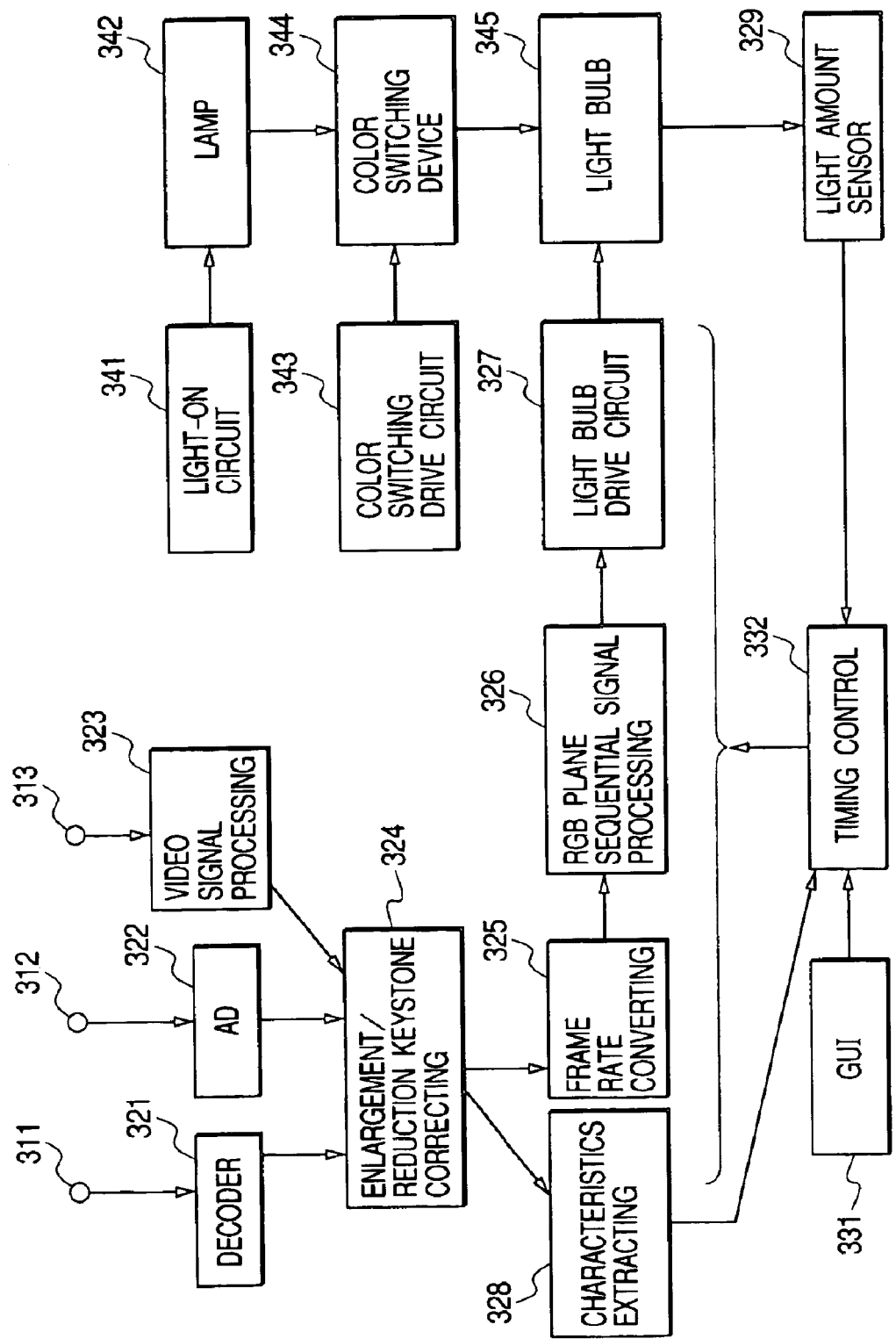
FIG. 24 is a block diagram showing an example of an image display circuit.

FIG. 24 is a block diagram showing an example of an image display circuit. Referring to FIG. 24, a digital video signal from a personal computer, etc. is inputted to a terminal 311, is decoded by a decoder 321, and is inputted to an enlargement/reduction keystone correcting circuit 324. An analog signal from the personal computer, etc. is inputted to a terminal 312, is converted into a digital signal by an A/D circuit, and is inputted to the enlargement/reduction keystone correcting circuit 324. A complex video signal from a television, etc. is processed by a video signal processing circuit 323, is inputted to a terminal 313, and is inputted to the enlargement/reduction keystone correcting circuit 324. An output from the enlargement/reduction keystone correcting circuit 324 is inputted to a frame rate converting circuit 325 and to a characteristics extracting circuit 328. The characteristics extracting circuit 328 extracts characteristics of an input signal such as information indicating that the amount of R-light, G-light, or B-light is large and information indicating that the amount of B, and outputs the extracted signal to a timing control circuit 332. An output from the frame rate converting circuit 325 is outputted to a light valve drive circuit 327 via an RGB plane sequential signal processing circuit 326. A GUI (Graphic User Interface) 331 selects any of the arrangements (a) to (h) of FIG. 23 in accordance with a user's instruction of the type of a reproduced video image regarding the color temperature, and outputs the selected arrangement to the timing control circuit 332.

A light-on circuit 341 lights on a lamp 342. Light from the lamp 342 is incident on an optical characteristics switching element 344. The optical characteristics switching element 344 is driven by a color switching drive circuit 343. Output light from the optical characteristics switching element 344 is radiated to a light valve element 345 such as a liquid crystal panel. A light amount sensor 329 measures the amount of light, associated with the change of the lamp 324 and the light valve element 345 and the change of a filter when time passes. An output from the light amount sensor 329 is inputted to the timing control circuit 332. The timing control circuit 332 controls the overall circuits of the characteristics extracting circuit 328, the frame rate converting circuit 325, the RGB plane sequential signal processing circuit 326, the light valve drive circuit 327, and the like, based on inputs of the GUI 331, the characteristics extracting circuit 328, and the optical sensor 329, thereby switching the optical characteristics switching element 344 by using any of the arrangements (a) to (h) of FIG. 23.

Hereinbelow, a description is given of the principle of outputting various color light with reference to FIGS. 25A to 25F.

FIGS. 25A to 25F show schematic diagrams of optical characteristics switching elements of the optical unit for the projection-type video display apparatus according to the present invention.

Figure 25A:
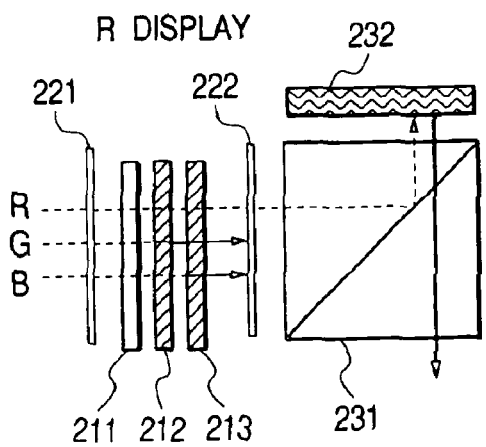
FIGS. 25A to 25F are first schematic diagrams for explaining the principle of an optical characteristics switching element.

FIG. 25A is a diagram of the principle of the R-light. Referring to FIG. 25A, a voltage is applied only to the R polarizing rotation control element 211 and no voltage is applied to the G polarizing rotation control element 212 and the B polarizing rotation control element 213. Among the R-, G-, and B-light as the S polarizing light, the G-light and the B-light are converted into the P polarizing light by the G polarizing rotation control element 212 and the B polarizing rotation control element 213 and the polarizing plate 222 prevents the transmission of the G-light and the B-light. On the contrary, the R-light is incident on the PBS 231 as the S polarizing light and is reflected to the PBS 231, thus being incident on the liquid crystal panel 232. Therefore, only the R-light can be incident on the liquid crystal panel 232.

Figure 25B:
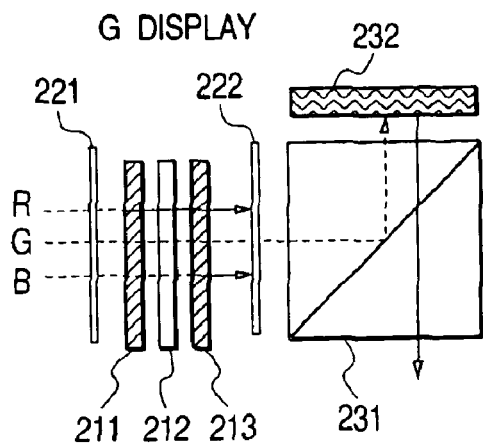

Referring to FIG. 25B, a voltage is applied only to the G polarizing rotation control element 212 and no voltage is applied to the R polarizing rotation control elements 211 and the B polarizing rotation control element 213. Therefore, only the S polarizing light of the G-light can be incident on the liquid crystal panel 232.

Figure 25C:
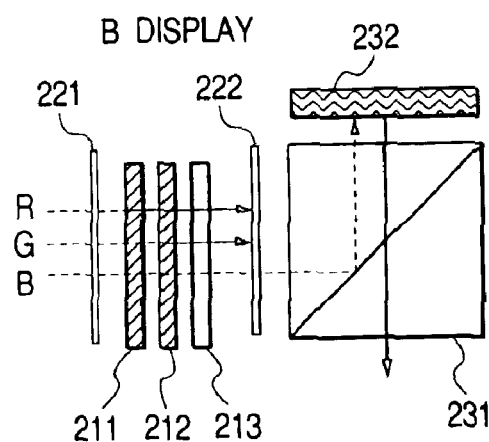

Referring to FIG. 25C, a voltage is applied only to the B polarizing rotation control element 213 and no voltage is applied to the R polarizing rotation control elements 211 and the G polarizing rotation control element 212. Therefore, only the S polarizing light of the B-light can be incident on the liquid crystal panel 232.

Figure 25D:
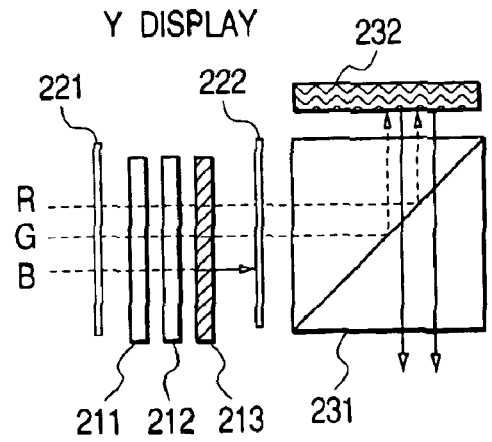

Referring to FIG. 25D, a voltage is applied to the R polarizing rotation control element 211 and the G polarizing rotation control element 212 and no voltage is applied to the B polarizing rotation control elements 213. Therefore, the S polarizing light of the R-light and the G-light can be incident on the liquid crystal panel 232 and, thus, Y-light (yellow light) is radiated to the liquid crystal panel 232.

Figure 25E:
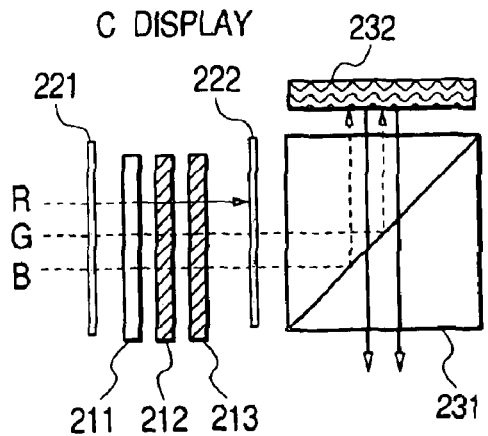

Referring to FIG. 25E, a voltage is applied to the G polarizing rotation control element 212 and the B polarizing rotation control element 213 and no voltage is applied to the R polarizing rotation control elements 211. Therefore, the S polarizing light of the G-light and the B-light can be incident on the liquid crystal panel 232 and, thus, C-light (cyan light) is radiated to the liquid crystal panel 232.

Figure 25F:
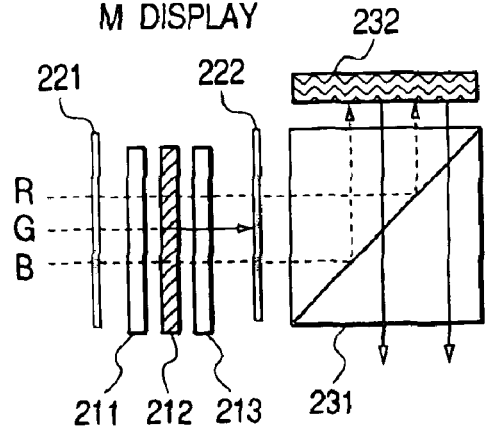

Referring to FIG. 25F, a voltage is applied to the R polarizing rotation control element 211 and the B polarizing rotation control element 213 and no voltage is applied to the G polarizing rotation control elements 212. Therefore, the S polarizing light of the R-light and the B-light can be incident on the liquid crystal panel 232 and, thus M-light (magenta light) is radiated to the liquid crystal panel 232.

As mentioned above, according to the present invention, it is possible to provide a projection-type video display apparatus which is compact and has improved contrast.

Further, it is possible to provide a projection-type video display apparatus having improved use-efficiency of light.

What is claimed is:

1. A video display apparatus comprising:
    an optical source unit for radiating light;
    a polarization converter for matching light, which is outputted by said light source unit, to one of S polarizing light and P polarizing light, said polarization converter comprising a polarizing beam splitter and a λ/2 phase difference plate;
    a light path changing element for changing a passing direction of light outputted by said polarization converter by substantially 90°;
    an optical characteristics switching element for electrically and periodically switching a wavelength band of the light outputted by said polarization converter;
    a video display element, as a reflection-type light valve element, for forming an optical image from the light outputted by polarization converter, in accordance with a video signal;
    a radiating device for radiating the light outputted by said polarization converter to said video display element to output light outputted by said video display element to a different direction from that of the light outputted by said polarization converter, said radiating device comprising a polarizing beam splitter; and
    a projector for projecting the light outputted by said video display element, the light outputted by said video display element being supplied via said radiating device,
    wherein a light path from said light source unit to said projector is U-shaped.

2. An apparatus according to claim 1, wherein:
    each of said light path changing element and said optical characteristics switching element is composed of a reflection-type optical characteristics switching element; and
    said reflection-type optical characteristics switching element switches the wavelength band of the light outputted by said polarization converter to output the light outputted by said polarization converter to a different direction by substantially 90°.

3. An apparatus according to claim 1, wherein said optical characteristics switching element is formed so as to switch the wavelength band of the light outputted by said polarization converter for a plurality of areas on said optical characteristics switching element, and radiates a different color light to each of different areas on said video display element simultaneously.

4. A projection-type video display apparatus according to claim 3, wherein said optical characteristics switching element switches the wavelength band such that said different areas on said video display element to each of which the different color light is radiated move sequentially to a predetermined direction.

* * * * *